United States Patent
Maitra et al.

(10) Patent No.: US 10,324,969 B2
(45) Date of Patent: Jun. 18, 2019

(54) SCORING DOCUMENTS

(71) Applicant: Accenture Global Solutions Limited, Dublin (IE)

(72) Inventors: Anutosh Maitra, Bangalore (IN); Shubhashis Sengupta, Bangalore (IN); Tom Geo Jain, Bangalore (IN); Roshni Ramesh Ramnani, Bangalore (IN); Hitanshu Rakeshkumar Tiwari, Ahmedabad (IN)

(73) Assignee: Accenture Global Solutions Limited, Dublin (IE)

( * ) Notice: Subject to any disclaimer, the term of this patent is extended or adjusted under 35 U.S.C. 154(b) by 513 days.

(21) Appl. No.: 15/046,032

(22) Filed: Feb. 17, 2016

(65) Prior Publication Data

US 2017/0161366 A1   Jun. 8, 2017

(30) Foreign Application Priority Data

Dec. 8, 2015   (IN) .......................... 6556/CHE/2015

(51) Int. Cl.
*G06F 16/33* (2019.01)
*G06Q 10/10* (2012.01)

(52) U.S. Cl.
CPC ..... *G06F 16/3344* (2019.01); *G06Q 10/1053* (2013.01)

(58) Field of Classification Search
CPC ....................... G06F 17/30654; G06F 16/9593
See application file for complete search history.

(56) References Cited

U.S. PATENT DOCUMENTS

2015/0317605 A1*  11/2015  Rao .................... G05Q 10/1053
                                                    705/321
2015/0317606 A1*  11/2015  Bubna ................ G06Q 10/1053
                                                    705/321

(Continued)

OTHER PUBLICATIONS

Rafter et al., "Personalised Retrieval for Online Recruitment Services," http://citeseerx.ist.psu.edu/viewdoc/download?doi=10.1.1.121.1619&rep=rep1&type=pdf, Apr. 2000, 13 pages.

(Continued)

*Primary Examiner* — Mohammad S Rostami
(74) *Attorney, Agent, or Firm* — Harrity & Harrity, LLP

(57) ABSTRACT

A device may receive a first textual document and a set of second textual documents. The first textual document may identify parameters. The device may process the first textual document, based on a natural language processing algorithm, to identify first values corresponding to the parameters. The device may process the plurality of second textual documents, based on the natural language processing algorithm, to identify second values corresponding to the parameters. Each of the plurality of second textual documents may be associated with one or more respective second values of the second values. The device may determine scores for the plurality of second textual documents. A score may be determined based on comparing one or more of the first values to one or more of the second values associated with a second textual document. The device may provide information identifying the plurality of second textual documents and the scores.

20 Claims, 11 Drawing Sheets

(56) References Cited

U.S. PATENT DOCUMENTS

| | | | | |
|---|---|---|---|---|
| 2016/0098477 | A1* | 4/2016 | Berajawala | G06F 17/30675 707/727 |
| 2016/0104075 | A1* | 4/2016 | Chowdhury | G06F 17/271 706/12 |
| 2016/0124958 | A1* | 5/2016 | Sinha | G06F 17/30867 707/733 |
| 2016/0147734 | A1* | 5/2016 | Allen | G06F 17/2775 704/9 |
| 2016/0292643 | A1* | 10/2016 | Rodriguez | G06Q 10/1053 |
| 2016/0335603 | A1* | 11/2016 | Davar | G06Q 10/1053 |
| 2017/0052938 | A1* | 2/2017 | Allen | G06F 17/243 |

OTHER PUBLICATIONS

Lee et al., "Proactive: Comprehensive Access to Job Information," http://www.pitt.edu/~peterb/papers/ProactiveFinal.pdf, Dec. 2012, 18 pages.

Monster.com, "Power Resume Search: An Overview," http://media.monster.com/id/training/JobAidsPRS/Download_Entire_User_Guide.pdf, Dec. 2009, 29 pages.

Hutterer, "Enhancing a Job Recommender With Implicit User Feedback," http://www.ec.tuwien.ac.at/~dorn/Thesis/Masters/Hutterer.pdf, Jun. 2011, 107 pages.

Giang, "Why New Hiring Algorithms Are More Efficient—Even If They Filter Out Qualified Candidates," http://www.businessinsider.in/Why-New-Hiring-Algorithms-Are-More-Efficient-Even-If-They-Filter-Out-Qualified-Candidates/articleshow/24710886.cms, Oct. 2013, 11 pages.

Fazel-Zarandi et al., "Semantic Matchmaking for Job Recruitment: An Ontology-Based Hybrid Approach," http://ceur-ws.org/Vol-525/paper4.pdf, Jan. 2009, 8 pages.

Seedlink Tech, "QuestMatch: Using Natural Language Processing to Improve Speed and Quality of Employee Recruiting," http://www.slideshare.net/RobinYoung10/questmatch-using-natural-language-processing-to-improve-speed-and-quality-of-employee-recruiting-48423633, Feb. 2014, 13 pages.

Weber, "Your Résumé vs. Oblivion," http://www.wsj.com/articles/SB10001424052970204624204577178941034941330, Jan. 2012, 5 pages.

Cappelli, "Making the Most of On-Line Recruiting," https://hbr.org/2001/03/making-the-most-of-on-line-recruiting, Mar. 2001, 18 pages.

Maniu et al., "A Human Resource Ontology for Recruitment Process," https://ideas.repec.org/a/fmb/journl/v10y2009i2p12-18.html, Nov. 2009, 7 pages.

Adams et al., "Beyond the Formalism Debate: Expert Reasoning, Fuzzy Logic, and Complex Statutes," http://scholarship.law.berkeley.edu/facpubs/2052/, Oct. 1999, 101 pages.

Kosko et al., "Fuzzy Logic," http://www.scientificamerican.com/article/fuzzy-logic-1993-07/, Jul. 1999, 6 pages.

Safavian et al., "A survey of decision tree classifier methodology," http://ieeexplore.ieee.org/xpl/login.jsp?tp=&arnumber=97458&url=http%3A%2F%2Fieeexplore.ieee.org%2Fxpls%2Fabs_all.jsp%3Farnumber%3D97458, Jun. 1991, 58 pages.

\* cited by examiner

SCORING DOCUMENTS

RELATED APPLICATION

This application claims priority under 35 U.S.C. § 119 to Indian Provisional Patent Application No. 6556/CHE/2015, filed on Dec. 8, 2015, the content of which is incorporated by reference herein in its entirety.

BACKGROUND

A requirements document may be produced for a particular purpose, such as for a product, a service, or the like. A requirements document may identify one or more parameters, and may identify requirement values pertaining to the one or more parameters. For example, a parameter may relate to a particular requirement of a group of requirements associated with the particular purpose.

SUMMARY

According to some possible implementations, a device may include one or more processors. The one or more processors may receive a first textual document and a set of second textual documents. The first textual document may identify one or more parameters. The one or more processors may process the first textual document, based on a natural language processing algorithm, to identify first values corresponding to the one or more parameters. The one or more processors may process the set of second textual documents, based on the natural language processing algorithm, to identify second values corresponding to the one or more parameters. Each of the set of second textual documents may be associated with one or more respective second values of the second values. The one or more processors may determine scores corresponding to the set of second textual documents. A score, for a second textual document of the set of second textual documents, may be determined based on comparing one or more of the first values to one or more of the second values associated with the second textual document. The one or more processors may provide information identifying the set of second textual documents and the scores.

According to some possible implementations, a non-transitory computer-readable medium may store one or more instructions that, when executed by one or more processors, may cause the one or more processors to receive a first textual document and a set of second textual documents. The first textual document may identify one or more parameters. The one or more instructions, when executed by the one or more processors, may cause the one or more processors to process the first textual document, based on a natural language processing algorithm, to identify first values corresponding to the one or more parameters. The one or more instructions, when executed by the one or more processors, may cause the one or more processors to process the set of second textual documents, based on the natural language processing algorithm, to identify second values corresponding to the one or more parameters. Each of the set of second textual documents may be associated with one or more respective second values of the second values. The one or more instructions, when executed by the one or more processors, may cause the one or more processors to determine respective sets of scores corresponding to the set of second textual documents. A set of scores, of the sets of scores and corresponding to a second textual document of the set of second textual documents, may be determined based on comparing one or more of the first values to one or more of the second values associated with the second textual document. The one or more instructions, when executed by the one or more processors, may cause the one or more processors to assign weights to scores, of the sets of scores, to generate weighted scores. The one or more instructions, when executed by the one or more processors, may cause the one or more processors to provide information identifying the set of second textual documents and the weighted scores.

According to some possible implementations, a method may include receiving, by a device, a first textual document and a set of second textual documents. The first textual document may identify one or more parameters. The method may include processing, by the device and based on a natural language processing algorithm, the first textual document to identify first values corresponding to the one or more parameters. The method may include processing the set of second textual documents, based on the natural language processing algorithm, to identify second values corresponding to the one or more parameters. Each of the set of second textual documents may be associated with one or more respective second values of the second values. The method may include determining, by the device, scores corresponding to the set of second textual documents. A score, for a second textual document of the set of second textual documents, may be determined based on comparing one or more of the first values to one or more of the second values associated with the second textual document. The method may include sorting, by the device, the set of second textual documents with regard to the scores. The method may include providing, by the device, information identifying a result of sorting the set of second textual documents.

DETAILED DESCRIPTION

The following detailed description of example implementations refers to the accompanying drawings. The same reference numbers in different drawings may identify the same or similar elements.

An entity may review candidate documents (e.g., resumes, curricula vitae, job applications, biographical information documents, etc.) that may be associated with candidates for a position (e.g., an employment position, a promotion, a grant, etc.). The position may be associated with requirements (e.g., educational requirements, skill requirements, experience requirements, locational requirements, task-based requirements, etc.). The entity may sort the candidates based on the requirements. For example, the entity may evaluate aptitude of the candidates for the position based on comparing information included in the candidate documents to the requirements. However, the entity may not always perform adequately when ranking the candidates. For example, the entity may overlook a particular candidate, may introduce bias to the ranking process, may improperly weight the requirements, or the like.

Implementations described herein enable a device to score candidate documents based on a requirements document that identifies requirements. The device may process the candidate documents and the requirements document based on a natural language processing algorithm to identify the requirements and candidate values pertaining to the requirements. The device may determine candidate value scores for the candidate documents based on the candidate values (e.g., based on a model, a machine learning algorithm, a fuzzy logic process, etc.). Based on the candidate value scores, the device may determine respective candidate document scores for the candidate documents (e.g., based on a model, a machine learning algorithm, a neural network processing algorithm, etc.). In some implementations, the device may sort the candidate documents based on the candidate document scores.

In this way, the device provides consistent, accurate, and unbiased candidate document scores, and saves organizational time and money that are otherwise used to score the candidate documents. By performing neural network processing, machine learning, fuzzy logic processing, or the like, the device conserves processor power, reduces reliance on inflexible rules, and improves accuracy of the scoring process.

Figure 1A:
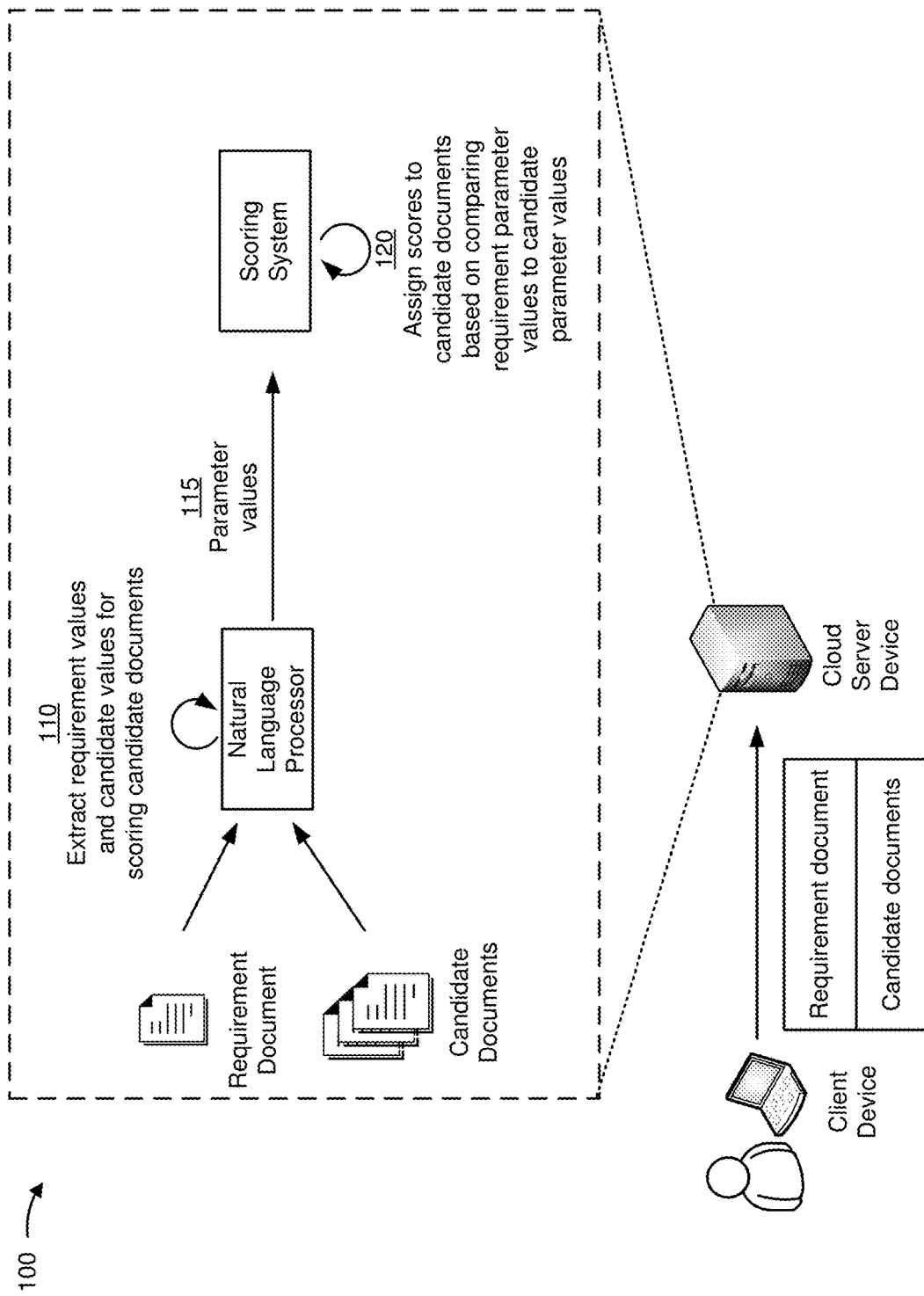
FIGS. 1A and 1B are diagrams of an overview of an example implementation described herein.
Figure 1B:
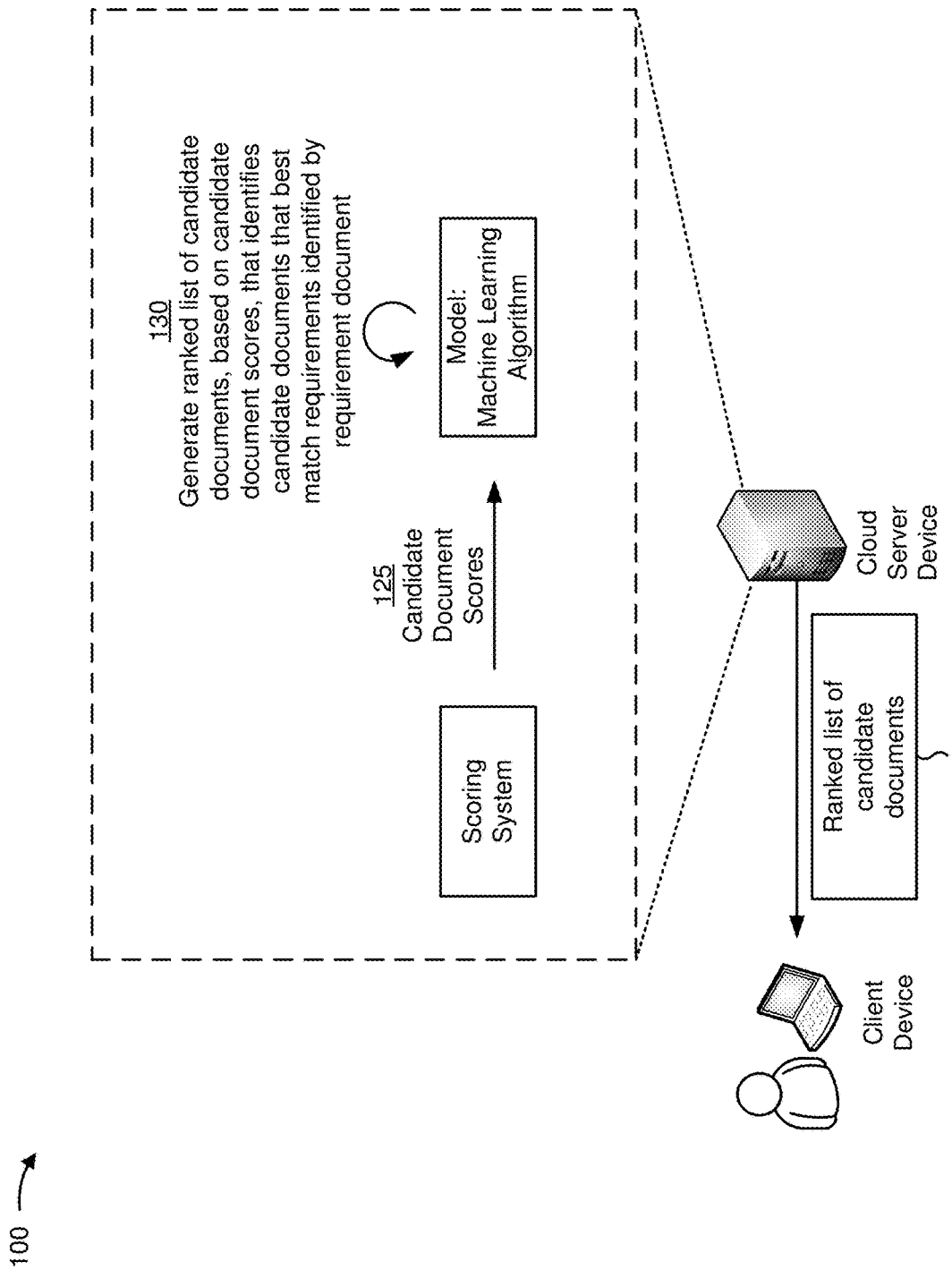

FIGS. 1A and 1B are diagrams of an overview of an example implementation 100 described herein. As shown in FIG. 1A, and by reference number 105, a cloud server device may receive a requirements document and a set of candidate documents from client device. The requirements document may relate to a set of parameters, and may identify requirement values for each parameter of the set of parameters. The candidate documents may include information describing candidates. For example, a candidate document, of the candidate documents, may be associated with a particular candidate that has particular candidate values.

As shown by reference number 110, based on performing natural language processing, the cloud server device may extract the requirement values and the candidate values. For example, the cloud server device may identify the parameters and the requirement values for the parameters by performing natural language processing operations on the requirements document, and may identify candidate values relating to the parameters by performing natural language processing on the candidate documents. As shown by reference number 115, the cloud server device may provide the parameter values (e.g., the requirement values and the candidate values) to a scoring system (e.g., a scoring system component of the cloud server device).

As shown by reference number 120, the cloud server device (e.g., the scoring system component of the cloud server device) may assign candidate value scores to the candidate documents based on comparing the requirement values to the candidate values. For example, the cloud server device may store rules, based on which to assign candidate value scores to the candidate documents. In some cases, the rules may relate to, for example, a length and/or breadth of experience associated with a candidate document, skills identified by a candidate document, tasks identified by a candidate document, educational background identified by a candidate document, or the like. In some cases, the rules may relate to non-Boolean logic processing (e.g., fuzzy logic processing, Bayesian logic processing, etc.), which may permit the cloud server device to score candidate documents more accurately with regard to the requirements document by identifying exceptions to requirements imposed by the parameters. As another example, the cloud server device may assign the candidate value scores based on inputting the candidate values and the requirement values to a model that may be trained based on a machine learning algorithm. The model may output the candidate value scores. In this way, the cloud server device conserves processor and storage resources that may otherwise be used to customize exceptions to parameters.

As shown in FIG. 1B, and by reference number 125, the cloud server device (e.g., the scoring system component of the cloud server device) may input the candidate value scores to a model that may be trained based on a machine learning algorithm (e.g., a neural network processing algorithm, a deep learning algorithm, etc.). The model may output respective candidate document scores for the set of candidate documents based on the candidate value scores assigned to the set of candidate documents. In some implementations, the model may assign particular weights to candidate value scores when calculating the candidate document scores, as described in more detail elsewhere herein.

As shown by reference number 130, based on the candidate document scores outputted by the model, the cloud server device may generate a ranked list of candidate documents. As further shown, the ranked list may identify candidate documents, of the set of candidate documents, that best match the requirement values identified by the requirements document. As shown by reference number 135, the cloud server device may output the ranked list to the client device. In some implementations, the cloud server device may output information identifying the candidate document scores, the candidate value scores, or the like.

In this way, the cloud server device generates a ranked list of candidate documents based on parameters identified by a requirements document. The cloud server device may use natural language processing to identify requirement values and candidate values for the parameters, which conserves processor resources associated with providing an interface for manually inputting the requirement values and the candidate values. The cloud server device may use a model associated with a machine learning algorithm to assign candidate value scores and/or candidate document scores to the candidate documents, which conserves processor resources associated with manually configuring rules to assign the candidate value scores and/or to sort the candidate documents.

While the description herein will focus on a requirements document relating to a position and candidate documents relating to candidates in consideration for the position, the description is not limited to this technology area. The description has applicability to other technology areas, such as product development, service development, or the like.

Figure 2:
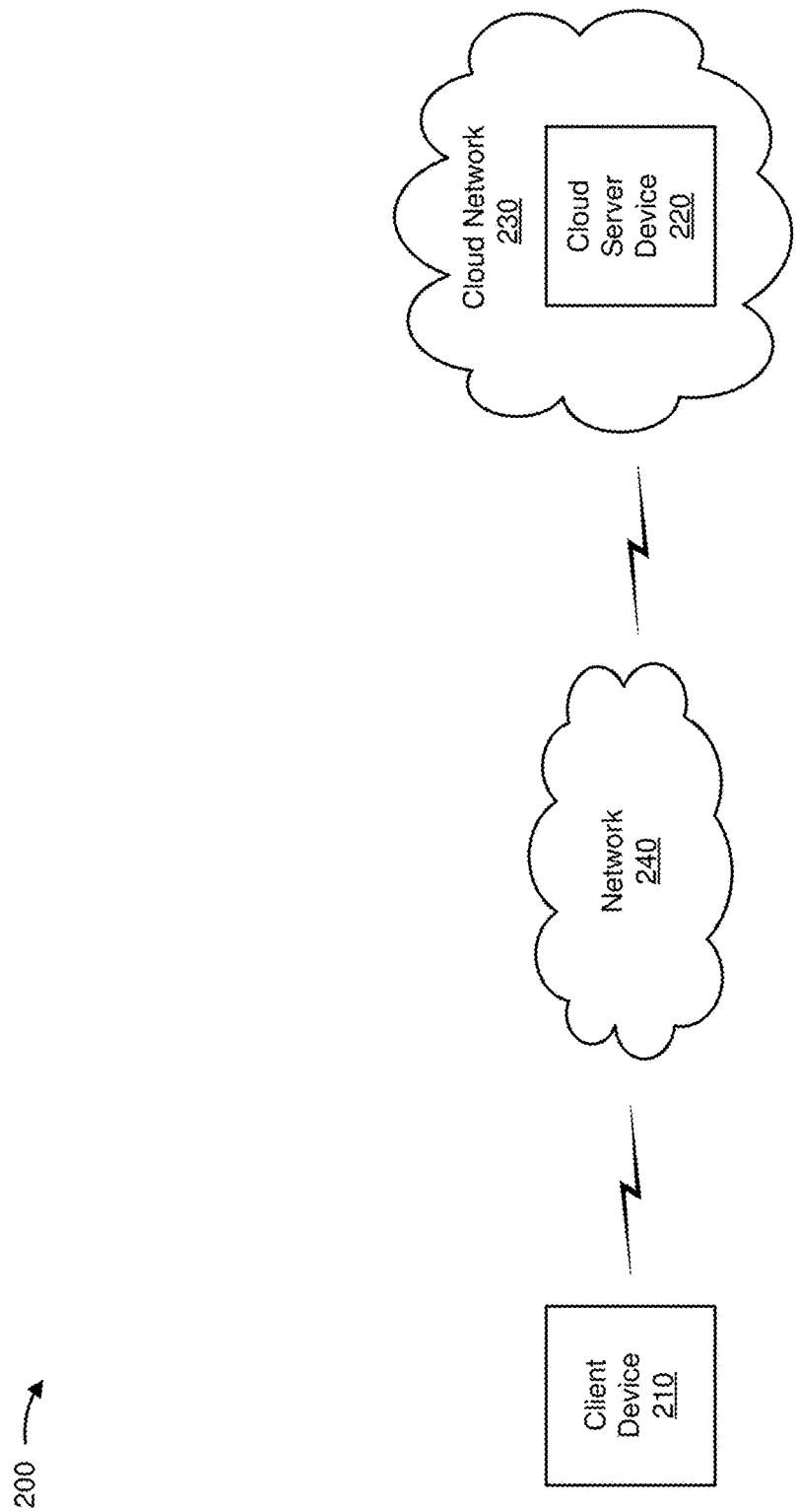
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, a cloud server device 220, a cloud network 230, and a network 240. Devices of environment 200 may interconnect via wired connections, wireless connections, or a combination of wired and wireless connections.

Client device 210 may include one or more devices capable of receiving, generating, storing, processing, and/or providing information. For example, client device 210 may include a communication and/or computing device, such as a mobile phone (e.g., a smart phone, a radiotelephone, etc.), a laptop computer, a tablet computer, a handheld computer, a wearable communication device (e.g., a smart wristwatch, a pair of smart eyeglasses, etc.), or a similar type of device.

In some implementations, client device 210 may receive information from and/or transmit information to another device in environment 200.

Cloud server device 220 may include one or more devices capable of storing, processing, and/or routing information. For example, cloud server device 220 may include a server device, a set of server devices, or the like. In some implementations, cloud server device 220 may include a communication interface that allows cloud server device 220 to receive information from and/or transmit information to other devices in environment 200. While cloud server device 220 is described as a resource in a cloud computing network, such as cloud network 230, cloud server device 220 may operate external to a cloud computing network, in some implementations.

Cloud network 230 may include an environment that delivers computing as a service, whereby shared resources, services, etc. may be provided by cloud server device 220 to store, process, and/or route information associated with an action plan. Cloud network 230 may provide computation, software, data access, storage, and/or other services that do not require end-user knowledge of a physical location and configuration of a system and/or a device that delivers the services (e.g., cloud server device 220). As shown, cloud network 230 may include cloud server device 220 and/or may communicate with client device 210 via one or more wired or wireless networks.

Network 240 may include one or more wired and/or wireless networks. For example, network 240 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
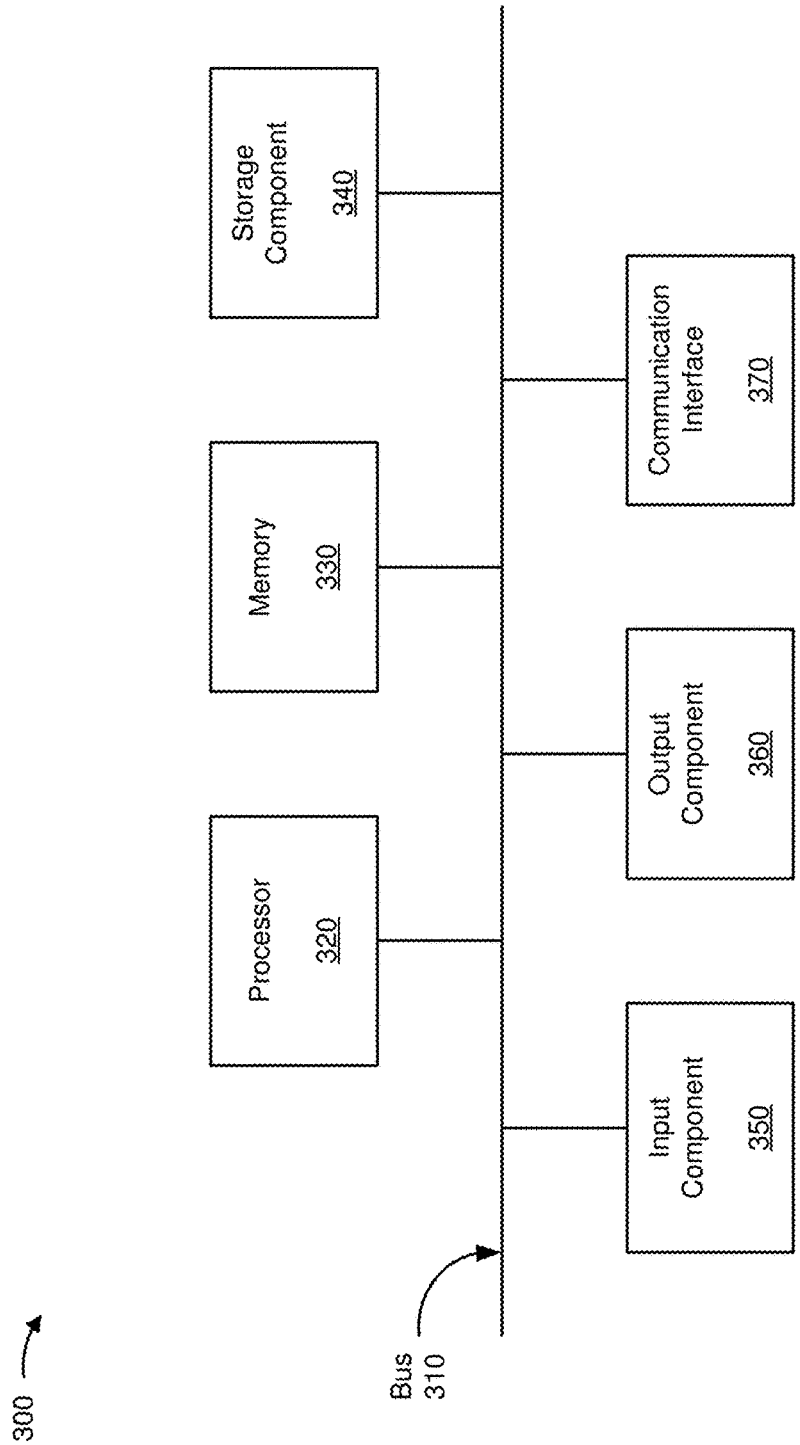
FIG. 3 is a diagram of example components of one or more devices of FIG. 2.

FIG. 3 is a diagram of example components of a device 300. Device 300 may correspond to client device 210 and/or cloud server device 220. In some implementations, client device 210 and/or cloud server device 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 320 may include one or more processors that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
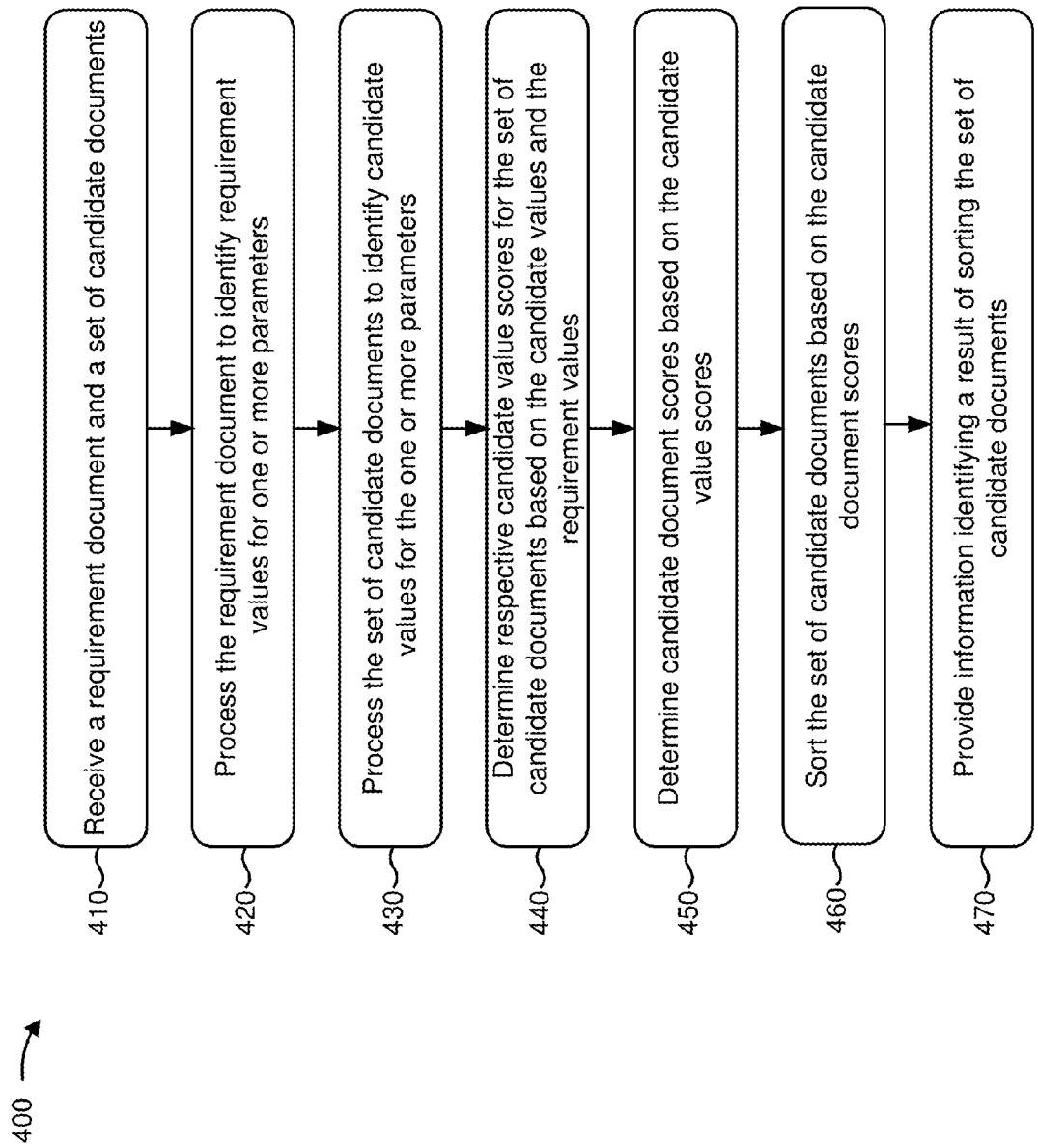
FIG. 4 is a flow chart of an example process for scoring documents.

FIG. 4 is a flow chart of an example process 400 for scoring documents. In some implementations, one or more process blocks of FIG. 4 may be performed by cloud server device 220. In some implementations, one or more process blocks of FIG. 4 may be performed by another device or a group of devices separate from or including cloud server device 220, such as client device 210.

As shown in FIG. 4, process 400 may include receiving a requirements document and a set of candidate documents (block 410). For example, cloud server device 220 may receive a requirements document and a set of candidate documents. In some implementations, cloud server device 220 may receive the requirements document and/or the set of candidate documents from another device (e.g., client device 210, etc.). Additionally, or alternatively, cloud server device 220 may receive the requirements document and/or the set of candidate documents based on an input (e.g., a user input to client device 210, a user input to another device, etc.).

The requirements document may be associated with one or more parameters, and may identify requirement values for the one or more parameters. For example, the requirements document may include a job description, a work order, a resume, a curriculum vitae, or the like. In some implementations, the requirements document may be received in a particular format. For example, the requirements document may be received in an unstructured textual format (e.g., in a format that is not associated with a particular data model, a format that is not associated with a pre-defined format, etc.). Additionally, or alternatively, the requirements document may be received in a structured format. For example, the requirements document may be received based on inputs to a form, in a comma-separated-value (CSV) format, in a tab-separated value (TSV) format, or the like. The requirements document may be associated with a party (e.g., a hiring manager, a recruiting firm, a human resources manager, etc.) that may select one or more candidate documents based on candidate values associated with the candidate documents.

A requirement parameter value may identify a preferred value for a candidate value, a required value for a candidate value, an acceptable value for a candidate value, an unacceptable value for a candidate value, a minimum value for a candidate value, a maximum value for a candidate value, or the like. In some implementations, cloud server device 220 may identify a range of requirement values for a particular parameter. For example, the requirements document may identify a particular parameter, and may specify a range of requirement values.

In some implementations, the parameters may include an education parameter, which may be associated with values of, for example, a level of education obtained (e.g., some high school, finished high school, some college, finished college, advanced degree, etc.), a type of degree obtained (e.g., an Associate of Arts (A.A.), an Associate of Science (A.S.), a Bachelor of Arts (B.A.), a Bachelor of Science (B.S.), a Master of Arts (M.A.), a Master of Fine Arts (M.F.A.), a Master of Science (M.S.), a Doctor of Philosophy (Ph.D.), a Doctor of Medicine (M.D.), a Juris Doctor (J.D.), etc.), a concentration associated with a degree (e.g., a particular field of engineering, a particular field of management, a particular field of art, a particular field of law, etc.), a grade associated with a degree, a particular college or set of colleges, one or more classes, or another type of education credential.

In some implementations, the parameters may include a skill parameter, which may be associated with values identifying a required or desired skill value (e.g., a skill associated with a programming language, a type of programming language, a certification, a development environment, a culinary discipline, a legal issue, data entry, a particular musical instrument, data processing, a level of experience associated with the skill, a length of time identified in relation with the skill, etc.).

In some implementations, the parameters may identify a task parameter, which may be associated with values identifying a task value (e.g., project management, testing, quality assurance, regulatory compliance, software programming, hardware design, interior design, child care, team management, etc.) and/or relating to the task (a length of time that the task lasted, a length of time since an end of the task, etc.).

In some implementations, the parameters may include an experience parameter, which may be associated with values identifying experience associated with a task, a skill, or the like (e.g., a length of time that the experience lasted, a length of time since an end of the experience, a proficiency level associated with the experience, a quantity of relevant tasks completed, a quantity of relevant projects completed, a quantity of certifications obtained, a score on a certification test, etc.).

In some implementations, the parameters may include a custom rule. For example, cloud server device 220 may receive a custom rule and parameter values relating to the custom rule. The custom rule may relate to, for example, a location requirement, an age requirement, a physical fitness requirement, a language fluency requirement, a typing speed, a data entry speed, a criminal history requirement, a familiarity with a culture, a skill requirement, an experience requirement, a task requirement, an education requirement, or the like. Cloud server device 220 may receive the custom rule based on a requirement or preference for candidates for a particular position. In some implementations, cloud server device 220 may receive information specifying actions that are associated with parameter values for the custom rule. For example, an action may include rejecting a candidate associated with a particular value, increasing or decreasing a score of a candidate associated with a particular value, notifying a party associated with the requirements document based on identifying a candidate associated with a particular value, or the like.

In some implementations, cloud server device 220 may receive a set of candidate documents. A candidate document may include a textual document that identifies parameter values relating to a candidate. For example, the candidate document may include a resume, a curriculum vitae, a job application, an email, or the like. In some implementations, the candidate document may be associated with a particular format (e.g., unstructured text, a data structure, a CSV format, a TSV format, a table, etc.). In some implementations, cloud server device 220 may receive a batch of candidate documents. Additionally, or alternatively, cloud server device 220 may receive an individual candidate document (e.g., based on a candidate submitting the individual candidate document, etc.).

In some implementations, cloud server device 220 may identify parameters associated with a requirements document and/or a candidate document based on a document type associated with the requirements document and/or the candidate document. For example, cloud server device 220 may determine that a set of candidate documents includes curricula vitae, and may identify parameters for which to obtain requirements values and candidate values based on a document type of "curriculum vitae." As another example, cloud server device 220 may determine that a requirements document includes a job description for a nursing position, and may identify parameters relevant to a nursing position. Cloud server device 220 may determine the document type based on processing the requirements document and/or the set of candidate documents, as described in more detail below.

As further shown in FIG. 4, process 400 may include processing the requirements document to identify requirement values for one or more parameters (block 420). For example, cloud server device 220 may process the requirements document to identify requirement values for one or more parameters. The requirements document may identify the one or more parameters, and may identify requirement values for the one or more parameters. For example, the requirements document may identify a particular length of time with regard to an experience parameter, may identify a particular type of degree with regard to an education parameter, may identify a particular task (e.g., market research, application development, team management, human resources, computer programming, etc.) with regard to a task parameter, may identify a particular skill with regard to a skill parameter, or the like. In some implementations, cloud server device 220 may generate a structured output that identifies the parameters and the requirement values based on processing the requirements document. For example, cloud server device 220 may generate an extensible markup (XML) sheet, a CSV table, a TSV table, a spreadsheet, or the like. In some implementations, another device (e.g., client device 210, etc.) may process the requirements document.

In some implementations, the requirements document may specify that a first requirement value is preferred in comparison to a second requirement value. For example, the requirements document may specify that a M.S. degree requirement value is preferred in comparison to a B.S. requirement value. In such a case, cloud server device 220 may score a candidate that is associated with a M.S. degree candidate value more highly than a candidate that is associated with a B.S. degree candidate value.

In some implementations, cloud server device 220 may process the requirements document based on a natural language processing engine (e.g., Weka, Apertium, Mallet, Natural Language Toolkit, Apache OpenNLP, UIMA, ClearNLP, etc.). For example, cloud server device 220 may process the requirements document based on a statistical natural language processing engine, a machine-learning-based natural language processing engine, or the like, to identify the parameters and/or the requirement values. In some implementations, cloud server device 220 may detect particular objects (e.g., words, phrases, strings, etc.) in the requirements document, and may identify the parameters and/or requirement values based on the particular objects. For example, cloud server device 220 may detect words or phrases such as "must," "required," "needed," "at least," "more than," "qualifications," "enough experience," "well-qualified," "very experienced," or the like, and may identify the parameters and/or the requirement values based on detecting the words or phrases.

As further shown in FIG. 4, process 400 may include processing the set of candidate documents to identify candidate values for the one or more parameters (block 430). For example, the one or more candidate documents may include candidate values relating to the one or more parameters identified by the requirements document. Cloud server device 220 may process the one or more candidate documents based on the one or more parameters to identify the candidate values. In some implementations, cloud server device 220 may generate a structured output based on the candidate values. For example, cloud server device 220 may identify the candidate values, and may output information identifying the candidate values, the one or more parameters, and/or requirement values relating to the one or more parameters. In some implementations, another device may process the set of candidate documents (e.g., client device 210, etc.).

In some implementations, cloud server device 220 may process the one or more candidate documents based on a natural language processing engine. For example, cloud server device 220 may use a natural language processing engine to identify the candidate values corresponding to the one or more parameters. To identify a candidate value, cloud server device 220 may detect particular objects in a candidate document, and may identify the candidate value in relation to the particular objects. For example, to identify a candidate value relating to an experience parameter, cloud server device 220 may identify a difference between a first date and a second date in a candidate document, may identify a word or phrase that identifies the experience parameter (e.g., "12 years," "nine months," "12 projects," etc.), or the like. As another example, to identify a candidate value relating to a skill parameter, cloud server device 220 may detect an object that is associated with skill parameters (e.g., "skills," "proficiencies," "certifications," "languages," etc.), and may identify candidate values for the skill parameters based on detecting the object.

In some implementations, cloud server device 220 may use a list of potential candidate values, a list of previously encountered candidate values, or the like, to identify the candidate values. For example, assume that cloud server device 220 stores information identifying "computer programming" as a potential candidate value for a skill parameter. Assume further that a particular candidate document includes the phrase "organized computer programming symposium." In that case, cloud server device 220 may detect a string of "computer programming" within the phrase. However, the phrase, in this case, may not indicate that the candidate document is associated with the "computer programming" skill. Cloud server device 220 may determine whether the string of "computer programming" is an actual parameter value based on the phrase of "organized computer programming symposium." For example, cloud server device 220 may determine that "computer programming" is preceded by the verb "organized," may determine that "computer programming" is an adjective of "symposium," or the like, and may accordingly determine that "computer programming" is not an actual parameter value for the skills parameter.

As further shown in FIG. 4, process 400 may include determining respective candidate value scores for the set of candidate documents based on the candidate values and the requirement values (block 440). For example, cloud server device 220 may determine candidate value scores for the one or more candidate documents. Cloud server device 220 may determine one or more candidate value scores for a particular candidate document based on candidate values associated with the particular candidate document, and based on corresponding requirement values for a requirements document that is associated with the particular candidate document. A particular candidate document may be associated with multiple, different candidate value scores, in some implementations. For example, cloud server device 220 may determine a candidate value score, for a particular candidate document, based on each parameter identified by a corresponding requirements document, based on each parameter for which cloud server device 220 detects a candidate value, or the like.

In some implementations, cloud server device 220 may determine a candidate value score based on an exact match between a candidate value and a requirement value. For example, if a skill parameter identifies the programming language of C++, cloud server device 220 may determine a candidate value score based on whether candidate values identify the programming language of C++. In a situation where the candidate value identifies the programming language of C++, cloud server device 220 may determine a favorable candidate value score (e.g., "match," "1," etc.), and in a situation where the candidate value does not identify the programming language of C++, cloud server device 220 may determine an unfavorable candidate value score (e.g., "no match," "0," etc.).

Additionally, or alternatively, cloud server device 220 may determine a candidate value score based on a relationship between a requirement value and a candidate value. For example, in some cases, a candidate value that does not exactly match a requirement value may nevertheless indicate that a candidate may be qualified to satisfy the requirement. As an example, a candidate value of "object-oriented programming" may indicate that a corresponding candidate may be qualified for a position associated with a requirement value of "C++" (e.g., based on C++ being an object-oriented programming language). Cloud server device 220 may determine a candidate value score for the candidate based on a relationship between the candidate value and the requirement value.

For example, cloud server device 220 may determine the candidate value score based on a knowledge base that identifies values and a relationship between the values. The knowledge base may include, for example, a graph data structure that includes nodes that identify values of parameters (e.g., candidate values and/or requirement values). The nodes of the graph data structure may be connected by links. A link between two nodes may indicate that values associated with the two nodes share a relationship. For example, in the graph data structure, an "object-oriented programming" node may be linked with nodes relating to object-oriented programming (e.g., computer programming, C++, Java, etc.). Cloud server device 220 may determine a candidate value score based on a distance between nodes of the graph data structure. For example, if a candidate value and a requirement value are directly linked in the graph data structure (e.g., if the candidate value and the requirement value share a link), cloud server device 220 may determine a candidate value score based on the link (e.g., a candidate value score in a range between 0 and 1, a candidate value score based on a numerical value associated with the link, etc.).

In some implementations, links may be associated with numerical values. For example, an entity that configures the graph data structure may associate the links with the numerical values to cause a particular candidate value score to be assigned with regard to a first node and a second node. For example, the entity may configure links between closely related nodes to be associated with better candidate value scores than links between loosely related nodes.

If a candidate value and a requirement value are indirectly linked in the graph data structure (e.g., if a candidate value node is linked with a requirement value node via two or more intermediate nodes and/or links), cloud server device 220 may determine a candidate value score based on the candidate value and the requirement value being indirectly linked (e.g., based on a quantity of the two or more intermediate nodes and/or links, based on numerical values associated with the two or more intermediate nodes and/or links, etc.). For example, cloud server device 220 may identify a shortest path between the candidate value and the requirement value (e.g., based on a pathfinding algorithm, such as the Floyd-Warshall algorithm, Dijkstra's algorithm, Johnson's algorithm, etc.), and may determine a sum of link values for links that occur along the shortest path. In this way, cloud server device 220 determines a candidate value score based on a data structure that correlates different parameter values, which improves accuracy of the scoring process.

In some implementations, cloud server device 220 may determine a candidate value score based on a non-Boolean logic process (e.g., a fuzzy logic process, a statistical logic process, a Bayesian logic process, etc.). For example, assume that an experience parameter is associated with a requirement value of at least five years. If cloud server device 220 applies a Boolean logic process to candidate documents, cloud server device 220 may disqualify candidate documents that are associated with 4 years of experience, 4.9 years of experience, or the like (e.g., based on the candidate documents being associated with experience values that are less than the requirement value of at least five years). In some implementations, cloud server device 220 may apply a non-Boolean logic process to the candidate documents. For example, cloud server device 220 may determine a candidate value score with regard to the experience parameter, or another parameter, based on a statistical approach, a non-binary relationship between candidate values and requirement values, or the like.

As one possible example, cloud server device 220 may determine a candidate value score for the experience parameter (e.g., expvalue) based on the below equations:

$$expvalue(req, app) = \begin{cases} fuzzfunc(1, app, (req \times kl)) & \text{if } app > req \times kl \\ fuzzfunc(-1, app, (req \times kh)) & \text{if } app < req \times kh \end{cases},$$

$$\text{where } fuzzfunc(\text{slope}, x, \text{central}) = \frac{1}{1 + e^{-slope*(x-central)}}.$$

Here, req identifies a requirement value for the experience parameter, and app identifies a candidate value for the experience parameter. Req and app may include numerical values corresponding to a length of time (e.g., 5 months, 10 years, etc.). Kl and kh may include numerical values. For example, kl may include a value less than or equal to 1, and kh may include a value greater than or equal to 1. In some implementations, initial values of slope, kl, and/or kh may be fixed (e.g., may be specified during configuration of cloud server device 220, as seed values, etc.). In some implementations, values of slope, kl, and/or kh may be configured (e.g., trained, refined, updated, etc.) based on operation of cloud server device 220 (e.g., based on a machine learning algorithm, a deep learning process, input from a party that implements cloud server device 220, etc.).

A lesser kl value, as compared to a greater kl value, may cause cloud server device 220 to determine a higher (e.g., more favorable) candidate value score for app values that are less than corresponding req values. For example, in a situation where app is less than req, a kl value of 0.3 may be associated with a higher candidate value score than a kl value of 0.6, assuming that the candidate value score is greater than zero in each situation. By using a lesser kl value, cloud server device 220 determines higher candidate value scores for less experienced candidates than when using a greater kl value.

A greater kh value, as compared to a lesser kh value, may cause cloud server device 220 to determine a higher (e.g., more favorable) candidate value score for app values that are greater than corresponding req values. For example, in a situation where app is greater than req, a kh value of 1.3 may be associated with a higher candidate value score than a kh value of 2.0, assuming that the candidate value score is less than 1 in each situation. By using a greater kh value, cloud server device 220 grants higher candidate value scores to more experienced candidates than when using a lesser kh value.

In some implementations, cloud server device 220 may determine a candidate value score based on combining multiple, different candidate value scores. For example, assume that a requirements document includes a string of "good at C++ with at least two years of experience." In that case, cloud server device 220 may identify requirement values of "C++," "good," and "at least two years of experience." Cloud server device 220 may determine that the requirement values are related based on a syntactical structure of the string. For example, cloud server device 220 may determine that "good" and "at least two years of experience" modify "C++," and may thereby determine that the requirement indicates a minimum skill level of "good" and a minimum experience level of "at least two years." Assume that a particular candidate document includes a string of "C++ expert certification, 2009-2014."

Continuing the above example, cloud server device 220 may process the particular candidate document to identify candidate values, and may assign candidate value scores to the candidate values. For example, cloud server device 220 may assign a first candidate value score based on the particular candidate document including a candidate value of C++ (e.g., based on the candidate value of C++ matching the requirement value of C++), may assign a second candidate value score based on the particular candidate document including a candidate value of expert (e.g., based on the candidate value of expert satisfying the requirement value of good), and/or may assign a third candidate value score based on the particular candidate document including a candidate value of 2009-2014 (e.g., based on a length of time identified by the candidate value, based on a length of time since an end date associated with the candidate value, etc.).

Cloud server device 220 may combine the first candidate value score, the second candidate value score, and/or the third candidate value score to determine a candidate document score for the candidate document with regard to the requirements document. For example, cloud server device 220 may determine the candidate document score based on an average of the candidate value scores, a highest candidate value score of the candidate value scores, a lowest candidate value score of the candidate value scores, a subset of the candidate value scores, a weighted average of the candidate value scores, a sum of the candidate value scores, a sum of a subset of the candidate value scores, a median of the candidate value scores, or the like.

In some implementations, cloud server device 220 may train a model based on a machine learning algorithm to determine candidate value scores. For example, cloud server device 220 may receive known candidate values, known requirement values, and known candidate value scores that are determined based on the known candidate values and the known requirement values. Cloud server device 220 may generate rules for the model based on the known candidate values, the known requirement values, and the known candidate value scores. The rules may specify operations to perform to generate candidate value scores based on the known requirement values and based on inputted candidate values. Once the model is trained, cloud server device 220 may input candidate values to the model to determine candidate value scores for the candidate values. For example, the model may determine candidate value scores based on inputted candidate values and based on the known requirement values.

In some implementations, cloud server device 220 may update the model to improve accuracy of candidate value scores generated by the model. For example, cloud server device 220 may identify particular candidate value scores that are generated based on particular candidate values. Cloud server device 220 may determine whether the particular candidate value scores are accurate (e.g., based on feedback from client device 210, etc.). In a situation where the particular candidate value scores are not accurate, cloud server device 220 may modify the particular candidate value scores so that the particular candidate value scores, as modified, are accurate. Cloud server device 220 may modify the rules based on the modified candidate value scores and based on the machine learning algorithm. For example, cloud server device may modify the rules to cause the model to output candidate value scores that more closely resemble the modified candidate value scores than the particular candidate value scores. Additionally, or alternatively, the model may be updated based on in input by a party that implements cloud server device 220. In this way, cloud server device 220 improves performance of the model, which conserves processor resources that are otherwise used to input rules for assigning candidate value scores.

In some implementations, cloud server device 220 may determine candidate value scores and/or candidate document scores for a candidate document with regard to multiple, different requirements documents. For example, cloud server device 220 may receive multiple, different requirements documents pertaining to multiple, different positions, and may determine respective parameters and respective requirement values for the parameters, based on the multiple, different requirements documents. Cloud server device 220 may compare candidate values for a candidate document, to requirement values for the multiple requirements documents, and may determine candidate value scores relating to the multiple requirements documents.

For example, cloud server device 220 may determine a first set of candidate value scores for the candidate document with regard to a first requirements document, may determine a second set of candidate value scores for the candidate document with regard to a second requirements document, and so on. In some implementations, cloud server device 220 may determine multiple candidate document scores based on the candidate value scores, may assign one or more categories to the candidate document based on the candidate value scores (e.g., best fit, good fit, poor fit, disqualified, etc.), or the like, as described in more detail below. In this way, cloud server device 220 processes and scores a candidate document with regard to multiple requirements documents, which conserves processor resources associated with individually scoring the candidate document with regard to each requirements document of the multiple requirements documents.

As further shown in FIG. 4, process 400 may include determining candidate document scores based on the candidate value scores (block 450). For example, each candidate document, of the set of candidate documents, may be associated with one or more respective candidate value scores. Client device 210 may determine respective candidate document scores, for the set of candidate documents, based on the candidate value scores associated with each of the set of candidate documents.

In a situation where the set of candidate documents is associated with multiple, different candidate value scores corresponding to multiple, different parameters, cloud server device 220 may assign weights to the multiple, different candidate value scores (e.g., based on relative importance of the multiple, different parameters, based on a confidence score associated with the multiple, different scores, based on a machine learning algorithm, etc.) to determine weighted scores, based on which to determine the candidate document scores.

In some implementations, cloud server device 220 may train a model to determine the candidate document scores based on a machine learning algorithm (e.g., a decision tree algorithm, a Bayesian algorithm, a clustering algorithm, an artificial neural network algorithm, etc.). For example, cloud server device 220 may obtain a set of candidate documents that are associated with known candidate value scores, with regard to a particular requirements document, and known candidate document scores, with regard to the particular requirements document, and may use this information to train a model. Cloud server device 220 may identify a relationship between candidate value scores corresponding to the set of candidate documents, and the candidate document scores corresponding to the set of candidate documents. For example, cloud server device 220 may determine weights to assign to particular candidate value scores, weights to assign to particular types of candidate value scores, operations to perform to generate the candidate document scores, or the like, based on a machine learning algorithm. In some implementations, the known candidate value scores and known candidate document scores may be provided by a party that implements cloud server device 220 (e.g., based on a supervised learning approach, etc.).

In some implementations, cloud server device 220 may update the model for determining candidate document scores based on feedback from client device 210. For example, cloud server device 220 may use a model to determine candidate document scores for a set of candidate documents with regard to a particular requirements document based on a set of candidate value scores associated with the set of candidate documents. In some implementations, cloud server device 220 may assign respective weights to the set of candidate value scores based on coefficients identified by the model. Cloud server device 220 may provide information identifying the candidate document scores associated with the set of candidate documents to client device 210 (e.g., information identifying ranks of the set of candidate documents, information identifying categories associated with the set of candidate documents, etc.). In some cases, a recipient of the candidate document scores may select one or more of the set of candidate documents, may specify a ranked order of the candidate documents, or the like.

In that case, cloud server device 220 may receive information identifying the selected candidate documents and/or the ranked order, and may update the model based on the machine learning algorithm. For example, cloud server device 220 may determine that the recipient tends to select candidate documents that are associated with an experience candidate value score that satisfies a threshold, and may modify the model to assign higher weight to experience candidate value scores that satisfy the threshold than to other candidate value scores. In this way, cloud server device 220 updates the model based on selections by a recipient of candidate document scores, which improves accuracy of the candidate document scores and conserves processor power that may otherwise be used to manually assign weights to candidate value scores and/or input rules for determining candidate document scores.

In some implementations, cloud server device 220 may train a model using a resume, a curriculum vitae, or the like, as a requirements document. For example, cloud server device 220 may receive a requirements document identifying a particular employee (e.g., a top-performing employee, a model employee, etc.), and may train the model based on the requirements document. Cloud server device 220 may receive candidate documents, and may input candidate values associated with the candidate documents to the model to generate candidate document scores based on the requirement document that identifies the particular employee. Based on the candidate document scores, cloud server device 220 may sort the candidate documents, may categorize the candidate documents, or the like. In this way, cloud server device 220 identifies candidate documents associated with candidates that resemble the particular employee.

As further shown in FIG. 4, process 400 may include sorting the set of candidate documents based on the candidate document scores (block 460). For example, cloud server device 220 may sort the set of candidate documents based on the candidate document scores. In some implementations, cloud server device 220 may create a ranked list of candidate documents based on the candidate document scores. For example, a first candidate document that is associated with a highest candidate document score may be ranked highest on the ranked list, a second candidate document that is associated with a second-highest candidate document score may be ranked second highest on the ranked list, and so on.

Additionally, or alternatively, cloud server device 220 may determine category information identifying a category for a candidate document. For example, the category may include a category for one or more candidate documents that are associated with candidate document scores that satisfy a first, higher threshold, a category for one or more candidate documents that are associated with candidate document scores that satisfy a second, lower threshold, a category for one or more candidate documents that are associated with candidate document scores that do not satisfy the first threshold or the second threshold, a category for one or more candidate documents that are associated with a candidate value and/or a candidate value score that disqualifies the one or more candidate documents from consideration for a position, or another category. In this way, cloud server device 220 determines categories for candidate documents, which may conserve processor resources as compared to generating a ranked list of the candidate documents.

In some implementations, cloud server device 220 may sort a candidate document with regard to multiple requirements documents. For example, cloud server device 220 may determine respective candidate document scores for the candidate document with regard to the multiple requirements documents, and may sort the multiple requirements documents based on the respective candidate document scores. For example, cloud server device 220 may assign categories to each of the multiple requirements documents with regard to the candidate document, or the like. In some implementations, cloud server device 220 may generate a ranked list of requirements documents with regard to the candidate document. For example, cloud server device 220 may assign a highest position to a requirements document that is associated with a highest candidate document score for the candidate document, may assign a second-highest position to a requirements document that is associated with a second-highest candidate document score for the candidate document, and so on. In this way, cloud server device 220 sorts a candidate document with regard to multiple requirements documents, which conserves processor resources that are otherwise used to individually sort the candidate document with regard to each requirements document.

As further shown in FIG. 4, process 400 may include providing information identifying a result of sorting the set of candidate documents (block 470). For example, cloud server device 220 may provide information identifying a result of sorting the set of candidate documents. In some implementations, cloud server device 220 may provide a ranked list of candidate documents. In such cases, cloud server device 220 may provide information identifying candidates associated with the candidate documents identified by the ranked list, may provide the candidate documents, or the like. In some implementations, cloud server device 220 may provide information identifying scores associated with the set of candidate documents (e.g., candidate document scores, candidate value scores, etc.), may provide information identifying categories assigned to candidate documents based on candidate document scores and/or candidate value scores, or the like.

In this way, cloud server device 220 conserves processor power that may otherwise be used to sort the candidate documents based on manually-specified rules, conserves processor power associated with manually providing candidate data, and improves accuracy of the candidate scoring process.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIGS. 5A-5F are diagrams of an example implementation 500 relating to example process 400 shown in FIG. 4. FIGS. 5A-5F show an example of scoring documents.

Figure 5A:
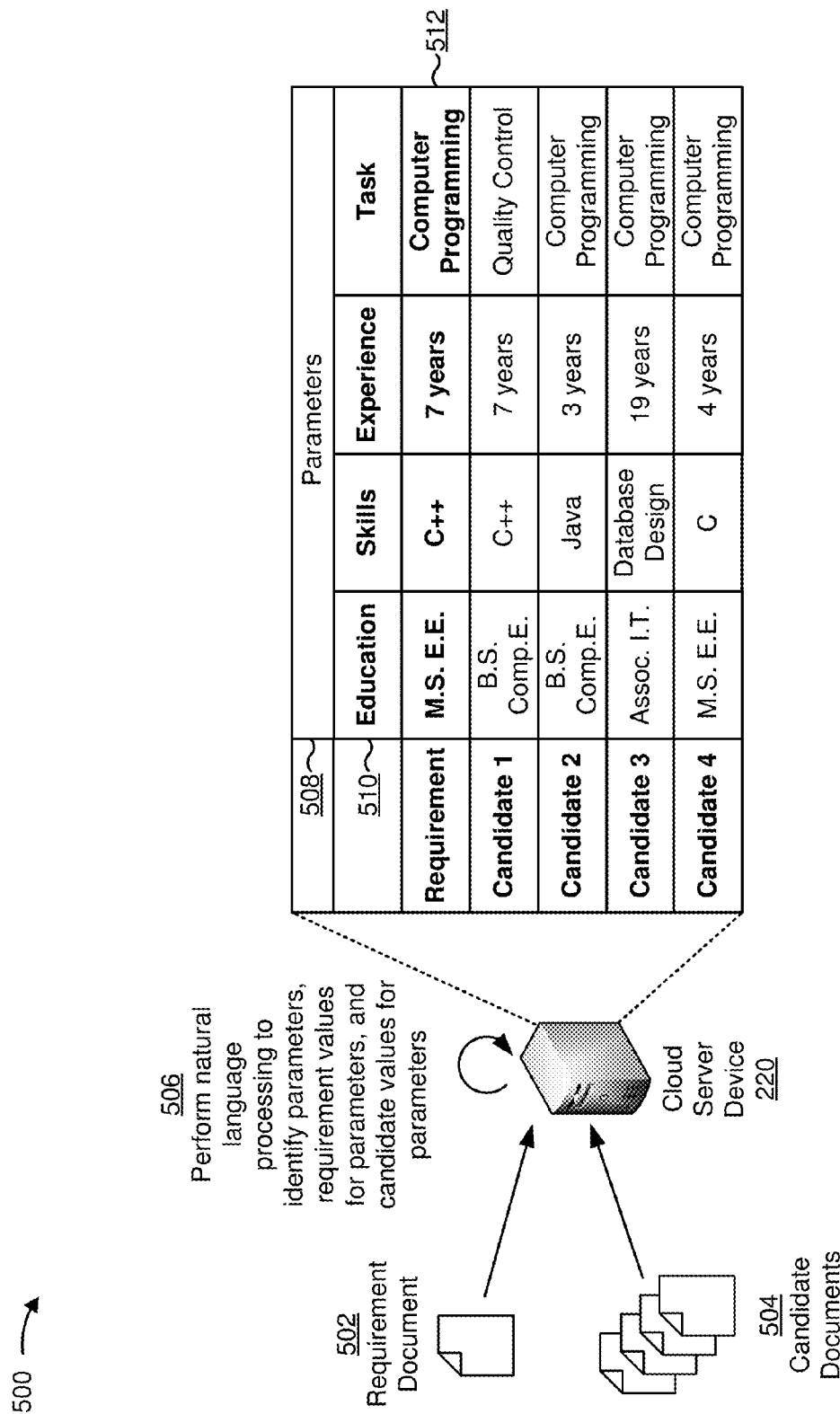
FIGS. 5A-5F are diagrams of an example implementation relating to the example process shown in FIG. 4.

As shown in FIG. 5A, and by reference number 502, cloud server device 220 may receive a requirements document (e.g., from client device 210, etc.). The requirements document may identify a set of parameters, and may identify requirement values pertaining to the set of parameters, as described in more detail below. As shown by reference number 504, cloud server device 220 may receive a set of candidate documents (e.g., from client device 210, from a database, etc.). Each candidate document, of the set of candidate documents, may identify candidate values pertaining to the set of parameters, as described in more detail below.

As shown by reference number 506, cloud server device 220 may perform natural language processing to identify the set of parameters, the requirement values identified by the requirements document, and the candidate values identified by the candidate documents. As shown by reference number 508, cloud server device 220 may detect the set of parameters. As shown by reference number 510, the set of parameters may include an education parameter, an experience parameter, a skill parameter, and a task parameter.

As shown by reference number 512, cloud server device 220 may detect the requirement values, which may be associated with the set of parameters. Here, a requirement value of "M.S. E. E." (e.g., Master of Science in Electrical Engineering) is associated with the education parameter, a requirement value of "C++" is associated with the skills parameter, a requirement value of "7 years" is associated with the experience parameter, and a task of "Computer Programming" is associated with the task parameter. Thus, the requirements document may be associated with a position for which an ideal candidate may have a Master of Science degree in a concentration of electrical engineering, and may have 7 years of experience in computer programming with C++.

As further shown, the candidate documents may identify four candidates that are associated with candidate values pertaining to the set of parameters. Here, Candidate 1 is associated with a candidate value of "B.S. Comp.E." (e.g., Bachelor of Science in Computer Engineering) pertaining to the education parameter, a candidate value of "C++" pertaining to the skill parameter, a candidate value of 7 years pertaining to the experience parameter, and a candidate value of "Quality Control" pertaining to the task value.

Candidate 2 is associated with a candidate value of "B.S. Comp.E." pertaining to the education parameter, a candidate value of "Java" pertaining to the skill parameter, a candidate value of 3 years pertaining to the experience parameter, and a candidate value of "Computer Programming" pertaining to the task value.

Candidate 3 is associated with a candidate value of "Assoc. I.T." (e.g., Associate Degree in Information Technology) pertaining to the education parameter, a candidate value of "Database Design" pertaining to the skill parameter, a candidate value of 19 years pertaining to the experience parameter, and a candidate value of "Computer Programming" pertaining to the task value.

Candidate 4 is associated with a candidate value of "M.S. E.E." (e.g., Master of Science in Electrical Engineering) pertaining to the education parameter, a candidate value of "C" pertaining to the skill parameter, a candidate value of 4 years pertaining to the experience parameter, and a candidate value of "Computer Programming" pertaining to the task value.

Figure 5B:
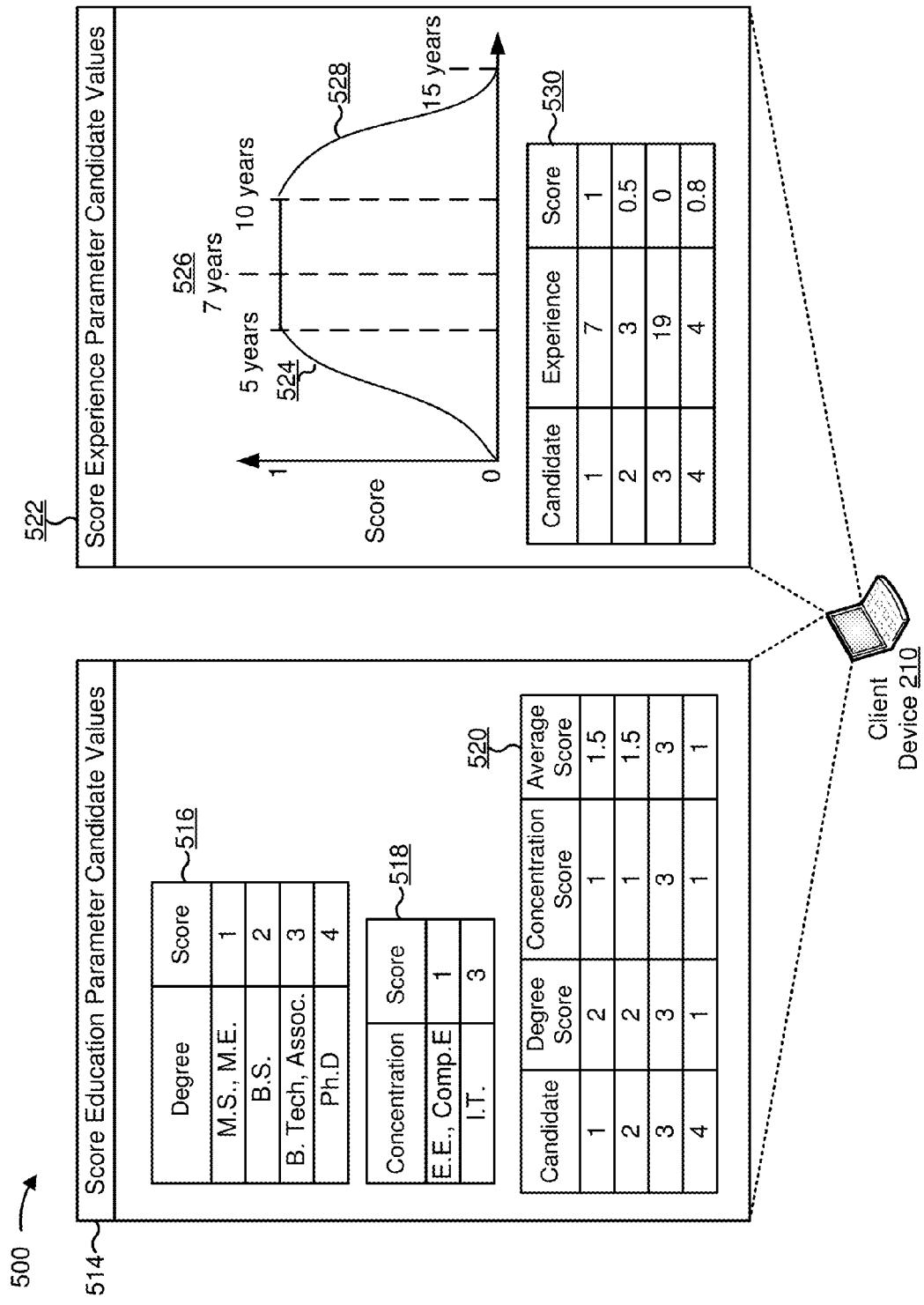

As shown in FIG. 5B, and by reference number 514, cloud server device 220 may determine candidate value scores for the education parameter based on the candidate values. For example, cloud server device 220 may receive rules identifying candidate values and specifying candidate value scores associated with the candidate values, may determine the rules based on a machine learning algorithm, or the like.

As shown by reference number 516, cloud server device 220 may determine degree candidate value scores based on degrees identified by candidate values. Here, an M.S. or M.E. degree receives a degree candidate value score of 1 (e.g., a best degree candidate value score relative to the other degree candidate value scores), a B.S. degree receives a degree candidate value score of 2, a B. Tech. or Associate degree receives a degree candidate value score of 3, and a Ph.D. receives a degree candidate value score of 4 (e.g., a worst degree candidate value score relative to the other degree candidate value scores, based on candidates with a Ph.D. being perceived as overqualified for the position).

As shown by reference number 518, cloud server device 220 may assign concentration candidate value scores based on degree concentrations identified by the candidate values. Here, a concentration of E.E. or Comp.E. is associated with a concentration candidate value score of 1 (e.g., a best concentration candidate value score relative to the other concentration candidate value scores), and a concentration of I.T. is associated with a concentration candidate value score of 3 (e.g., a worst concentration candidate value score relative to the other concentration candidate value scores).

As shown by reference number 520, to determine an education candidate value score for the candidate documents, cloud server device 220 may average a degree candidate value score and a concentration candidate value score for each candidate document. Here, the candidate documents associated with Candidates 1 and 2 receive education candidate value scores of 1.5, the candidate document associated with Candidate 3 receives an education candidate value score of 3 (e.g., a worst education candidate value score, as compared to the education candidate value scores associated with the candidate documents), and the candidate document associated with Candidate 4 receives an education candidate value score of 1 (e.g., a best education candidate value score, as compared to the education candidate value scores associated with the candidate documents). Assume that cloud server device 220 stores the education candidate value scores.

As shown by reference number 522, cloud server device 220 may score the candidate documents based on candidate values for the experience parameter. For example, cloud server device 220 may use a model that is associated with a non-Boolean logic operation (e.g., a fuzzy logic operation, etc.), as described in more detail in connection with block 440 of FIG. 4, above.

As shown by reference number 524, candidate values that identify an experience value of less than five years are assigned an experience candidate value score that is less than 1 (e.g. based on an exponential decay). Here, an experience candidate value score of 1 is a best experience candidate value score, and an experience candidate value score of 0 is a worst experience candidate value score. In some implementations, attributes of the model may be trained and/or updated based on a machine learning algorithm, a deep learning algorithm, or the like. For example, the minimum experience value, the maximum experience value, a slope associated with the model, or the like, may be trained and/or updated based on the machine learning algorithm, the deep learning algorithm, or the like.

As shown by reference number 526, based on the requirement value of 7 years, candidate values that identify an experience value between 5 years and 10 years are assigned an experience candidate value score of 1. As shown by reference number 528, candidate values that identify an experience value of greater than 10 years are assigned an experience candidate value score that is less than 1 (e.g., based on an exponential decay). In this way, cloud server device 220 scores candidate documents based on a non-Boolean logic operation, which permits candidates that do not exactly satisfy the requirements document to be considered for the position.

As shown by reference number 530, cloud server device 220 may determine an experience candidate value score of 1 for Candidate 1, an experience candidate value score of 0.5 for Candidate 2, an experience candidate value score of 0 for Candidate 3, and an experience candidate value score of 0.8 for Candidate 4.

Figure 5C:
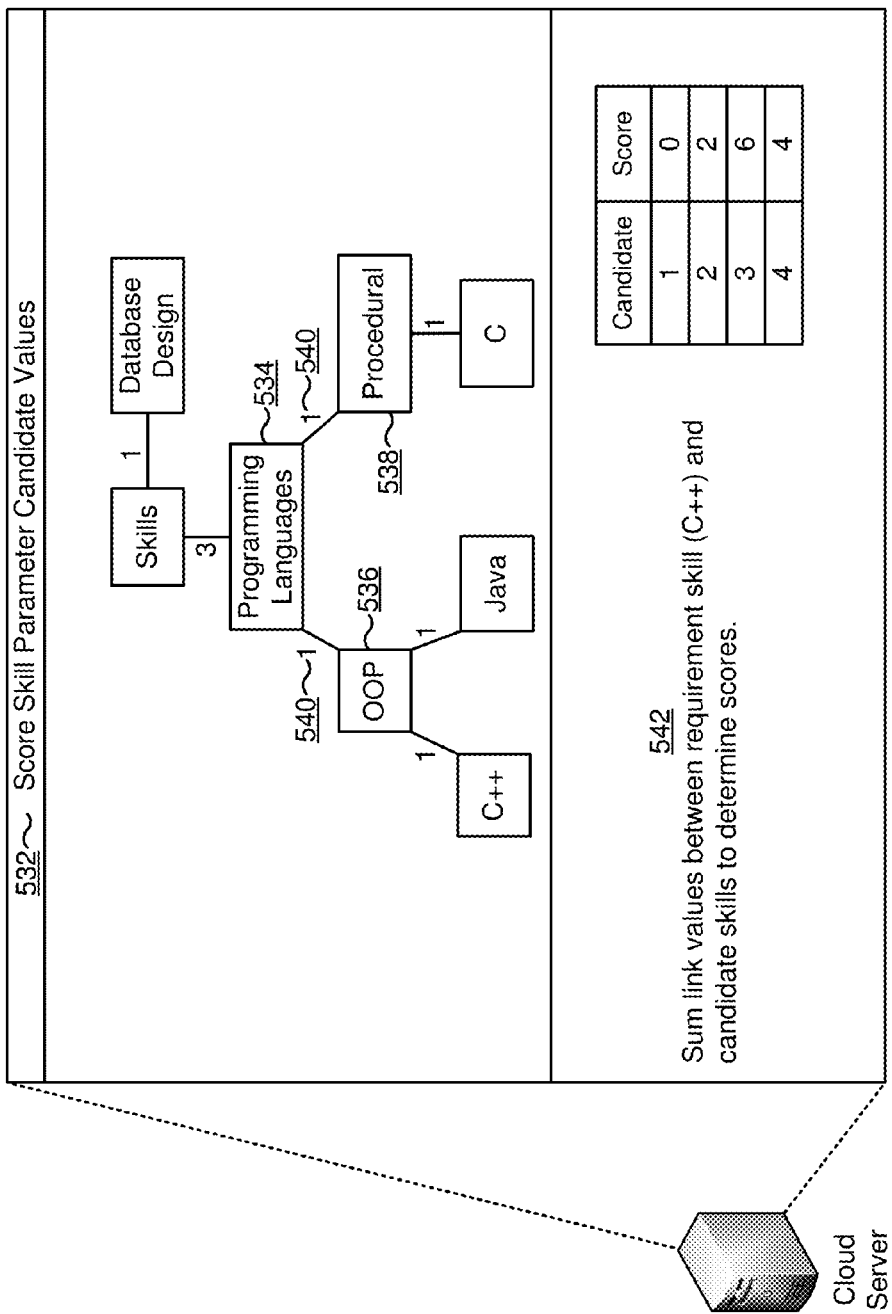

As shown in FIG. 5C, and by reference number 532, cloud server device 220 may score the candidate documents with regard to the skill parameter. In some implementations, cloud server device 220 may score the skill parameter, or another parameter, with regard to a knowledge base. The knowledge base may include, for example, a graph data structure, as shown. As shown by reference number 534, the graph data structure may include nodes that identify parameter values (e.g., candidate values and requirement values). For example, the node identified by reference number 534 identifies a skill of "programming languages," and other nodes shown include "skills," "C++," "Java," and so on. The graph data structure shown is not intended to be exhaustive of possible implementations of the knowledge base graph data structure, and the knowledge base graph data structure may include additional nodes, different nodes, or the like.

To assign a skill candidate value score to a candidate document, cloud server device 220 may identify a requirement value in a requirements document and a candidate value in the candidate document. Cloud server device 220 may determine the skill candidate value score based on the graph data structure. For example, assume that a requirements document identifies a requirement value of "Object-oriented programming" (e.g., associated with a node 536 of "OOP," as shown by reference number 536), and assume that a particular candidate document identifies a candidate value of "Procedural programming" (e.g., associated with a node 538 of "Procedural," as shown by reference number 538). To determine a skill candidate value score for the particular candidate document, cloud server device 220 may sum values associated with links that connect node 536 to node 538. As shown by reference numbers 540, the links may be associated with values of 1. Thus, cloud server device 220 may assign the particular candidate document a skill candidate value score of 2 (e.g., based on determining a sum of the two link values of 1 and 1). In this way, cloud server device 220 determines a candidate value score for skills that are related to a skill identified by a requirements document based on a knowledge base. Thus, cloud server device 220 reduces processor usage and time that would otherwise be used to explicitly define related skills for each requirements document.

As shown by reference number 542, cloud server device 220 may determine skill candidate value scores with regard to Candidates 1 through 4. Here, Candidate 1 is assigned a skill candidate value score of 0 (e.g., a best skill candidate value score, based on Candidate 1 being associated with a candidate value of C++ that matches the requirement value of C++). As further shown, Candidate 2 is assigned a skill candidate value score of 2 (e.g., based on Candidate 2 being associated with a candidate value of Java, and based on determining a sum of the link values of two links between C++ and Java in the graph data structure). As shown, Candidate 3 is assigned a skill candidate value score of 6 (e.g., based on determining a sum of the link values between C++ and Database Design in the graph data structure). As further, shown, Candidate 4 is assigned a skill candidate value score of 4 (e.g., based on determining a sum of the link values between C++ and C in the graph data structure). Assume that cloud server device 220 stores the skill candidate value scores.

Figure 5D:
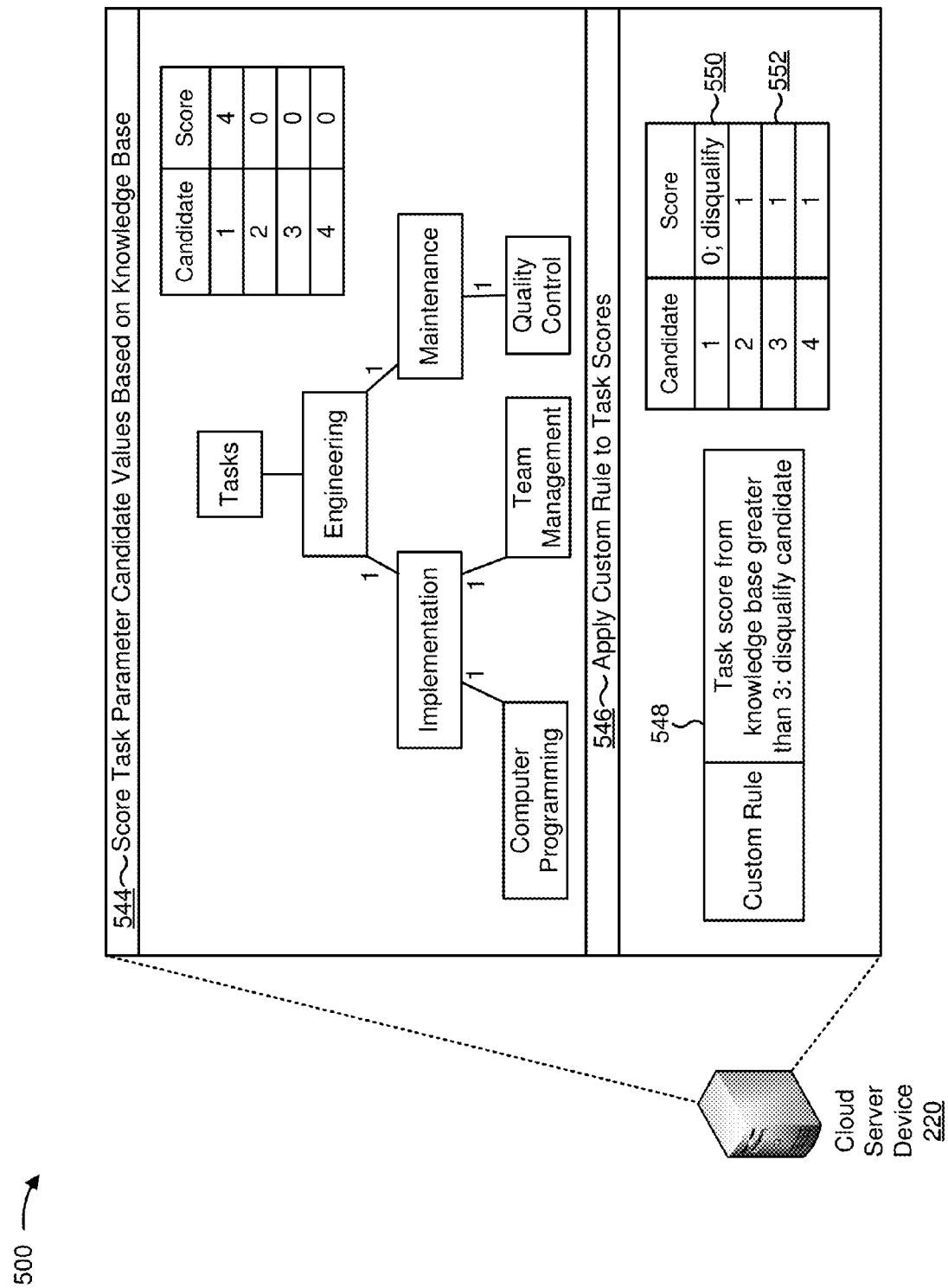

As shown in FIG. 5D, and by reference number 544, cloud server device 220 may determine task candidate value scores based on a task knowledge base (e.g., a graph data structure similar to the knowledge base described in connection with FIG. 5C, above). The task knowledge base may include nodes that identify tasks (e.g., engineering, implementation, maintenance, computer programming, team management, and quality control), and links that connect the nodes to one another. In some implementations, the links may be associated with link values. Here, as shown, each link is associated with a link value of 1.

Cloud server device 220 may determine a task candidate value score with regard to a particular candidate value and a particular requirements value by identifying links that connect a node associated with the particular candidate value, and a node associated with the particular requirements value (e.g., based on a Floyd-Warshall algorithm, etc.). Cloud server device 220 may determine a score for the particular candidate value based on determining a sum of link values associated with the identified links. Here, cloud server device 220 determines a task candidate value score of 4 for Candidate 1, and task candidate value scores of 0 for Candidates 2 through 4.

As shown by reference number 546, cloud server device 220 may score Candidates 1 through 4 with regard to the task parameter based on a custom rule. For example, cloud server device 220 may receive information in the requirements document identifying the custom rule, or the like. As shown, the custom rule may specify an action to perform with regard to candidate documents that are not associated with a particular task candidate value score. As shown by reference number 548, the custom rule indicates to disqualify candidate documents that are associated with a task candidate value score, based on the knowledge base, that is greater than 3. As shown by reference number 550, based on the candidate document associated with Candidate 1 being associated with a task candidate value score of 4, cloud server device 220 may disqualify Candidate 1. For example, cloud server device 220 may not sort the candidate document associated with Candidate 1, may assign a particular category (e.g., poor fit, disqualified, etc.) to the candidate document associated with Candidate 1, or the like.

As shown by reference number 552, based on the candidate documents associated with Candidates 2, 3, and 4 being associated with task candidate value scores that are equal and below the threshold score of 3, the candidate documents may be assigned task candidate value scores of 1. Assume that cloud server device 220 stores information identifying the task candidate value scores.

Figure 5E:
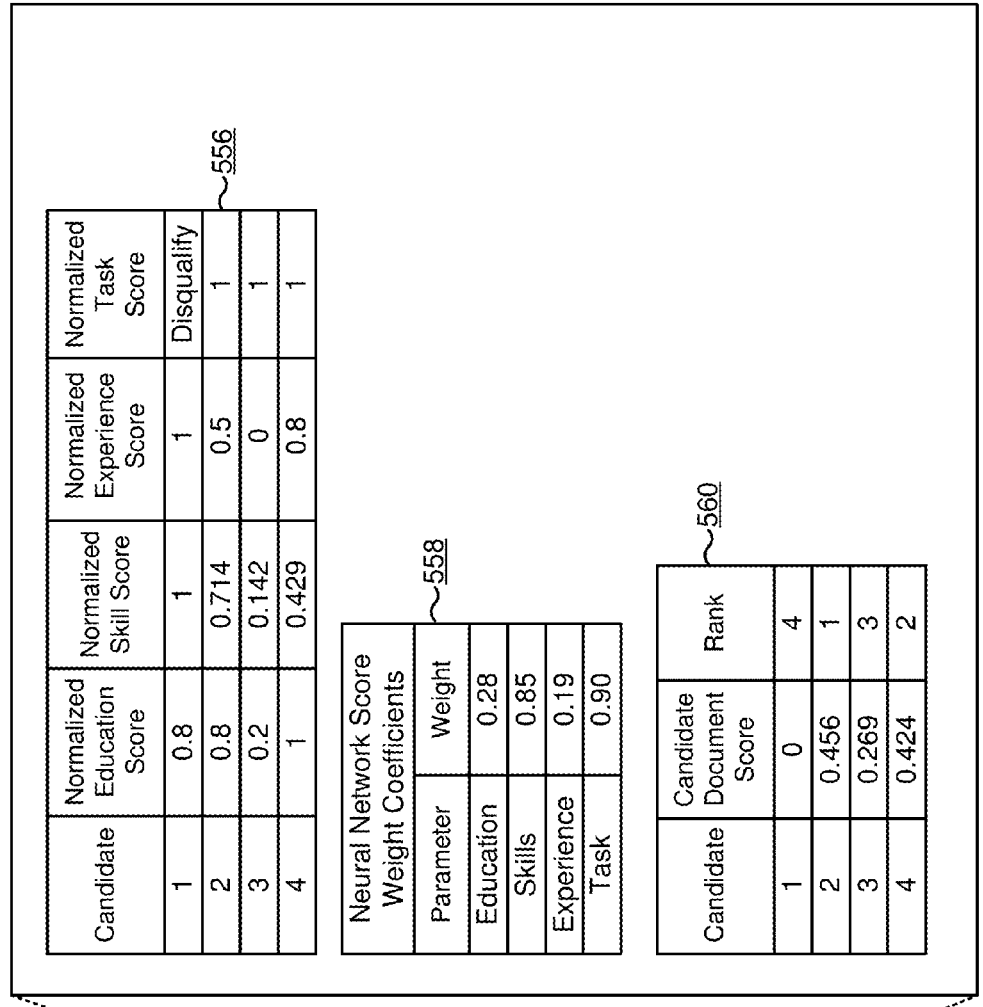

As shown in FIG. 5E, and by reference number 554, cloud server device 220 may normalize the candidate value scores (e.g., the education candidate value scores, the experience candidate value scores, the skill candidate value scores, and the task candidate value scores). As shown by reference number 556, cloud server device 220 may normalize each candidate value score based on values of a lowest (e.g., worst) normalized candidate value score of 0, and a highest (e.g., best) normalized candidate value score of 1.

As shown, cloud server device 220 may determine the candidate document scores based on a neural network processing algorithm. For example, cloud server device 220 may generate and/or train a model based on a machine learning algorithm (e.g., a neural network processing algorithm, etc.) to determine the candidate document scores, as described in more detail in connection with block 450, above. As shown by reference number 558, the education parameter may be associated with a weight of 0.28, the skills parameter may be associated with a weight of 0.85, the experience parameter may be associated with a weight of 0.19, and the task parameter may be associated with a weight of 0.90. In this case, the weights associated with the parameters may indicate that a party associated with the requirements document has historically selected candidate documents that score highly with regard to the skill parameter or the task parameter more often than the hiring entity has selected candidate documents that score highly with regard to the education parameter or the experience parameter.

As shown by reference number 560, cloud server device 220 may determine candidate document scores for Candidates 1 through 4, and may generate a ranked list based on the candidate document scores. Here, cloud server device 220 determines the candidate document score for Candidate 1 based on determining that Candidate 1 is disqualified (e.g., based on the task candidate value not including "computer programming"), and assigns a candidate document score of 0 based on Candidate 1 being disqualified.

Cloud server device 220 may determine the candidate document scores for Candidates 2 through 4 based on the normalized candidate value scores and based on the score weight coefficients associated with the model. For example, for Candidate 2, cloud server device 220 may determine a weighted education candidate value score (e.g., based on multiplying the normalized education candidate value score for Candidate 2 of 0.8, by, the education score weight coefficient of 0.28), a weighted skill candidate value score, a weighted experience candidate value score, and a weighted task candidate value score, and may determine a candidate document score based on a mean of the weighed scores. Here, the candidate document score for Candidate 2 (e.g., the mean of the weighted education candidate value score, the weighted skill candidate value score, the weighted experience candidate value score, and the weighted task candidate value score) is 0.456. Assume that cloud server device 220 determines the candidate document scores for Candidate 3 (e.g., 0.269) and Candidate 4 (e.g., 0.424) similarly.

As further shown, cloud server device 220 may generate a ranked list based on the candidate document scores. As shown, the ranked list may associate a first position with Candidate 2 (e.g., based on Candidate 2 being associated with a greatest candidate document score), may associate a second position with Candidate 4 (e.g., based on Candidate 4 being associated with a second-greatest candidate document score), may associate a third position with Candidate 3 (e.g., based on Candidate 3 being associated with a third-greatest candidate document score), and may associate a fourth position with Candidate 4 (e.g., based on Candidate 4 being disqualified based on the custom rule).

Figure 5F:
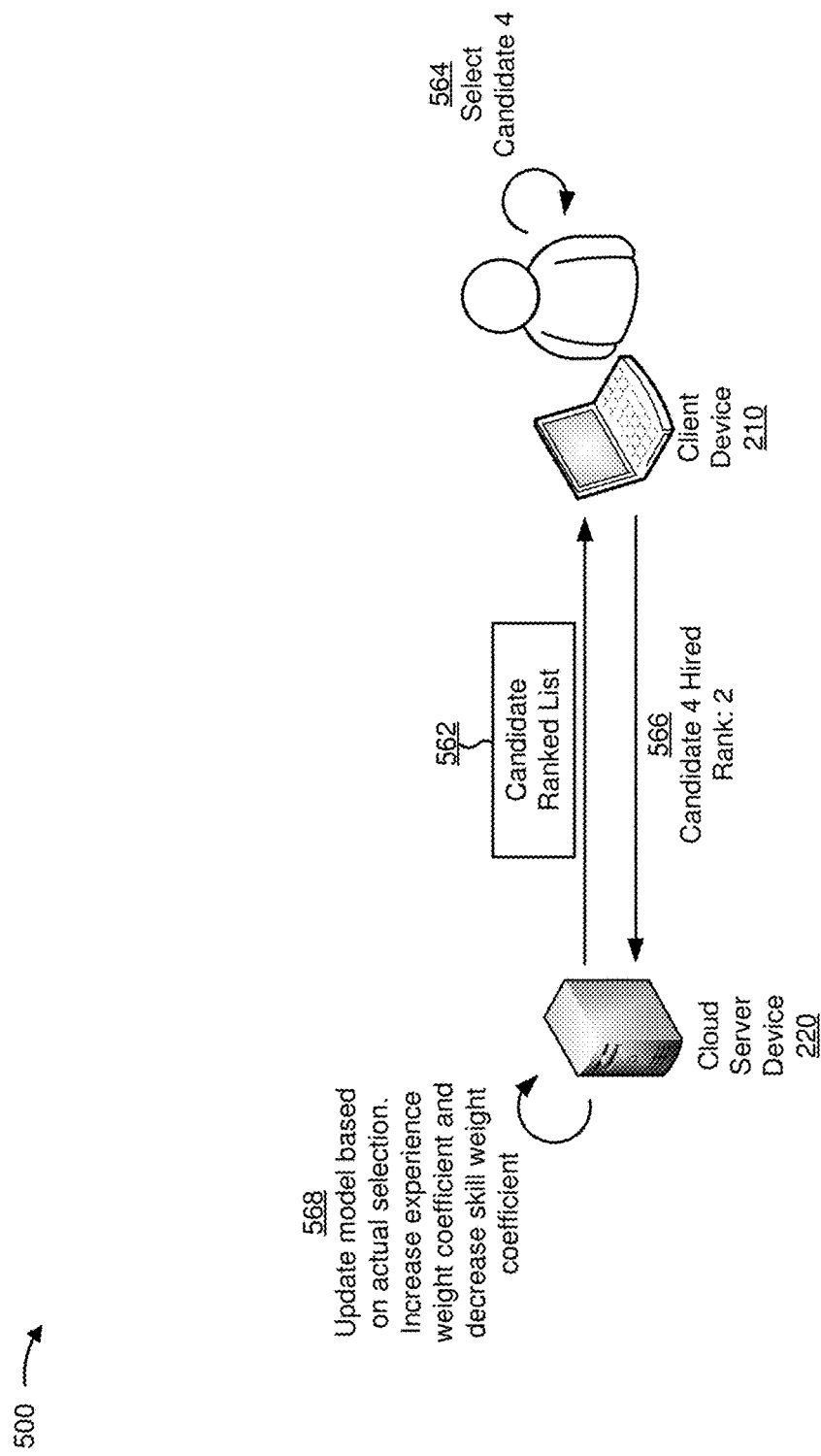

As shown in FIG. 5F, and by reference number 562, cloud server device 220 may provide information identifying the ranked list to client device 210. In some implementations, cloud server device 220 may provide the candidate documents identified by the ranked list, the candidate document scores, candidate value scores for one or more parameters, or the like. As shown by reference number 564, the party may select Candidate 4 for a position associated with the requirements document. As shown by reference number 566, the party may provide information indicating that the party selects Candidate 4. As further shown, Candidate 4 may be associated with a second-greatest position based on the ranked list.

As shown by reference number 568, cloud server device 220 may update the model based on the actual selection by the hiring party (e.g., Candidate 4). Here, cloud server device 220 determines to increase the experience weight coefficient and to decrease the skill weight coefficient. For example, cloud server device 220 may compare the candidate document scores and candidate value scores for a highest-ranked candidate and a selected candidate, and may determine that weight coefficients associated with the candidate value scores are to be adjusted based on a neural network processing algorithm.

Here, Candidate 4 (e.g., the selected candidate) is associated with a greater normalized experience candidate value score and a lesser normalized skill candidate value score than Candidate 2 (e.g., the highest-ranked candidate), so cloud server device 220 increases the experience weight coefficient and decreases the skill weight coefficient. In this way, cloud server device 220 updates the model based on selections by a hiring party, which conserves processor resources and organizational resources that are otherwise used to configure rules for selecting candidate documents.

As indicated above, FIGS. 5A-5F are provided merely as an example. Other examples are possible and may differ from what was described with regard to FIGS. 5A-5F.

In this way, a client device sorts candidate documents based on parameters identified by a requirements document. The client device may use natural language processing to identify requirement values and candidate values for the parameters, which conserves processor resources associated with providing an interface for manually inputting the requirement values and the candidate values. The client device may use a model generated based on a machine learning algorithm to assign scores to the candidate documents, which conserves processor resources associated with manually configuring rules to assign the scores and/or to sort the candidate documents.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
 one or more memories; and
 one or more processors, communicatively coupled to the one or more memories, to:
  receive a first textual document and a plurality of second textual documents,
   the first textual document identifying one or more parameters;
  process the first textual document, based on a natural language processing algorithm, to identify first values corresponding to the one or more parameters,
   the first values including at least two of:
    an experience value identifying an experience credential,
    a task value identifying a type of task,
    a skill value identifying a skill, or
    an education value identifying an educational credential;
  process the plurality of second textual documents, based on the natural language processing algorithm, to identify second values corresponding to the one or more parameters,
   each of the plurality of second textual documents being associated with one or more respective second values of the second values;
  determine second scores corresponding to the plurality of second textual documents,
   a second score, for a second textual document of the plurality of second textual documents, being determined based on comparing one or more of the first values to one or more of the second values associated with the second textual document,
   the second score being determined based on a graph data structure,
    the graph data structure including a plurality of nodes that identify the first values and the second values,
    the graph data structure including links that connect nodes of the plurality of nodes, and
   the second score being determined based on respective values corresponding to the links;
  determine first scores corresponding to the plurality of second textual documents,
   the first scores being determined based on a model that is generated based on a machine learning algorithm,
    the model outputting the first scores based on receiving the second scores as inputs,
    the model being updated based on selections by a recipient of the first scores,
   the first scores being determined based on combining the second scores,
    a particular second textual document, of the plurality of second textual documents, being associated with a plurality of second scores,
     the particular second textual document being associated with one or more first scores;
  assign a first weight to a particular second score, of the plurality of second scores associated with the particular second textual document, to generate a weighted particular second score; and assign a second weight to another second score, of the second scores associated with the particular second textual document, to generate a weighted other second score, the first weight being different than the second weight; and determine a first score, of the one or more first scores associated with the particular second textual document, based on combining the weighted particular second score and the weighted other second score; and provide information identifying the plurality of second textual documents and the first scores.

2. The device of claim 1, where the one or more processors, when determining the first scores, are to:

sort the plurality of second textual documents based on the first scores; and provide information identifying a result of sorting the plurality of second textual documents.

3. The device of claim 1, where the one or more processors are further to:

generate a ranked list based on the first scores, the ranked list identifying the plurality of second textual documents and identifying ranks associated with the plurality of second textual documents; and where the one or more processors, when providing the information, are to:

provide information identifying the ranked list.

4. The device of claim 3, where the ranked list is a first ranked list that identifies first ranks; and where the one or more processors are to:

receive information identifying a second ranked list, the second ranked list identifying the plurality of second textual documents and identifying second ranks associated with the plurality of second textual documents; and update the model based on comparing the first ranked list to the second ranked list.

5. The device of claim 1, where the one or more processors, when receiving the first textual document, are to:

receive the first textual document in an unstructured textual format.

6. The device of claim 1, where the machine learning algorithm is a neural network processing algorithm.

7. A non-transitory computer-readable medium storing instructions, the instructions comprising:

one or more instructions that, when executed by one or more processors, cause the one or more processors to:

receive a first textual document and a plurality of second textual documents, the first textual document identifying one or more parameters;

process the first textual document, based on a natural language processing algorithm, to identify first values corresponding to the one or more parameters, the first values including at least two of:

an experience value identifying an experience credential, a task value identifying a type of task, a skill value identifying a skill, or an education value identifying an educational credential;

process the plurality of second textual documents, based on the natural language processing algorithm, to identify second values corresponding to the one or more parameters, each of the plurality of second textual documents being associated with one or more respective second values of the second values;

determine second scores corresponding to the plurality of second textual documents, a second score, for a second textual document of the plurality of second textual documents, being determined based on comparing one or more of the first values to one or more of the second values associated with the second textual document, the second score being determined based on a graph data structure, the graph data structure including a plurality of nodes that identify the first values and the second values, the graph data structure including links that connect nodes of the plurality of nodes, and the second score being determined based on respective values corresponding to the links;

determine respective pluralities of first scores corresponding to the plurality of second textual documents, the pluralities of first scores being determined based on a model that is generated based on a machine learning algorithm, the model outputting the pluralities of first scores based on receiving a plurality of the second scores as inputs, the model being updated based on selections by a recipient of the pluralities of first scores;

the first scores being determined based on combining the second scores, a particular second textual document, of the plurality of second textual documents, being associated with a plurality of second scores, the particular second textual document being associated with one or more first scores;

assign a first weight to a particular second score, of the plurality of second scores associated with the particular second textual document, to generate a weighted particular second score; and assign a second weight to another second score, of the second scores associated with the particular second textual document, to generate a weighted other second score, the first weight being different than the second weight; and determine a first score, of the one or more first scores associated with the particular second textual document, based on combining the weighted particular second score and the weighted other second score; and provide information identifying the plurality of second textual documents and the first scores.

8. The non-transitory computer-readable medium of claim 7, where the one or more instructions, when executed by the one or more processors, further cause the one or more processors to:

identify a document type associated with the first textual document; and identify the one or more parameters based on the document type.

9. The non-transitory computer-readable medium of claim 7, where the one or more instructions, that cause the one or more processors to determine the pluralities of first scores, cause the one or more processors to:
  determine the first score, of the pluralities of first scores, based on comparing a particular first value, of the first values, to a particular second value, of the second values, based on a non-Boolean logic operation.

10. The non-transitory computer-readable medium of claim 7, where the one or more instructions, that cause the one or more processors to determine the pluralities of first scores, cause the one or more processors to:
  determine a second score, of the pluralities of second scores, based on comparing a particular first value, of the first values, to a particular second value, of the second values based on the graph data structure,
  the particular first value being different than the particular second value, and
  a first node, of the plurality of nodes, and a second node, of the plurality of nodes, identifying the particular first value and the particular second value, respectively.

11. The non-transitory computer-readable medium of claim 10, where the one or more instructions, that cause the one or more processors to determine the second score, cause the one or more processors to:
  determine the second score based on at least one of:
    one or more nodes or links connecting the first node and the second node in the graph data structure, or
    values associated with the one or more nodes or links.

12. The non-transitory computer-readable medium of claim 7, where the machine learning algorithm is a neural network processing algorithm.

13. The non-transitory computer-readable medium of claim 7, where the one or more instructions, that cause the one or more processors to receive the first textual document, cause the one or more processors to:
  receive the first textual document in an unstructured textual format.

14. A method, comprising:
  receiving, by a device, a first textual document and a plurality of second textual documents,
    the first textual document identifying one or more parameters;
  processing, by the device and based on a natural language processing algorithm, the first textual document to identify first values corresponding to the one or more parameters,
    the first values including at least two of:
      an experience value identifying an experience credential,
      a task value identifying a type of task,
      a skill value identifying a skill, or
      an education value identifying an educational credential;
  processing, by the device and based on the natural language processing algorithm, the plurality of second textual documents to identify second values corresponding to the one or more parameters,
    each of the plurality of second textual documents being associated with one or more respective second values of the second values;
  determining, by the device, second scores corresponding to the plurality of second textual documents,
    a second score, for a second textual document of the plurality of second textual documents, being determined based on comparing one or more of the first values to one or more of the second values associated with the second textual document,
    the second score being determined based on a graph data structure,
      the graph data structure including a plurality of nodes that identify the first values and the second values,
      the graph data structure including links that connect nodes of the plurality of nodes, and
      the second score being determined based on respective values corresponding to the links;
  determining, by the device, first scores corresponding to the plurality of second textual documents,
    the first scores being determined based on a model that is generated based on a machine learning algorithm,
    the model outputting the first scores based on receiving the second scores as inputs,
    the model being updated based on selections by a recipient of the first scores, the first scores being determined based on combining the second scores,
    a particular second textual document, of the plurality of second textual documents, being associated with a plurality of second scores,
      the particular second textual document being associated with one or more first scores;
  assigning, by the device, a first weight to a particular second score, of the plurality of second scores associated with the particular second textual document, to generate a weighted particular second score;
  assigning, by the device, a second weight to another second score, of the second scores associated with the particular second textual document, to generate a weighted other second score,
    the first weight being different than the second weight;
  determining, by the device, a first score, of the one or more first scores associated with the particular second textual document, based on combining the weighted particular second score and the weighted other second score;
  sorting, by the device, the plurality of second textual documents with regard to the first scores; and
  providing, by the device, information identifying a result of sorting the plurality of second textual documents.

15. The method of claim 14, where each second textual document, of the plurality of second textual documents, is associated with a respective plurality of first scores; and
  where sorting the plurality of second textual documents comprises:
    assigning categories to particular second textual documents, of the plurality of second textual documents, based on the respective pluralities of first scores and based on the model,
      the model receiving the respective pluralities of first scores as input and outputting respective categories assigned to the particular second textual documents; and
  where providing the information identifying the result of sorting the plurality of second textual documents comprises:
    providing category information identifying the categories and the particular second textual documents to a second device.

16. The method of claim 15, where the categories are first categories and the category information is first category information; and
  where the method further comprises:
    receiving, from the second device, second category information identifying second categories assigned to the particular second textual documents, at least one of the second categories being different than any of the first categories; and modifying one or more rules associated with the model based on comparing the first category information and the second category information.

17. The method of claim 14, where determining the first second scores comprises:

determining the second scores based on a custom rule,
the custom rule identifying one or more second values and one or more first scores to assign to a second textual document, of the second textual documents, that is associated with the one or more second values.

18. The method of claim 14, where a first node, corresponding to a particular first value, of the first values, is connected to a second node, corresponding to a particular second value, of the second values, by a plurality of links; and where determining the second scores comprises:
identifying respective values for each link of the plurality of links; and
determining the second score, of the second scores, based on combining the respective values of the plurality of links.

19. The method of claim 14, where the machine learning algorithm is a neural network processing algorithm.

20. The method of claim 14, where receiving the first textual document comprises:

receiving the first textual document in an unstructured textual format.

* * * * *